United States Patent [19]

Miyata et al.

[11] Patent Number: 5,426,502
[45] Date of Patent: Jun. 20, 1995

[54] OPTICAL FIBER INTERFERENCE WAVELENGTH/FREQUENCY DETECTION APPARATUS WHICH ELIMINATES A MOVABLE ELEMENT

[75] Inventors: Hideyuki Miyata; Hiroshi Onaka; Yoshihto Onoda, all of Kawasaki, Japan

[73] Assignee: Fujitsu Limited, Kawasaki, Japan

[21] Appl. No.: 138,083

[22] Filed: Oct. 20, 1993

[30] Foreign Application Priority Data

Mar. 9, 1993 [JP] Japan .................. 5-048178
Sep. 2, 1993 [JP] Japan .................. 5-218510

[51] Int. Cl.$^6$ .......................................... G01B 9/02
[52] U.S. Cl. ................................ 356/345; 356/346; 250/227.27
[58] Field of Search ........................ 356/345, 346; 250/227.19, 227.27

[56] References Cited

U.S. PATENT DOCUMENTS 4,790,655 12/1988 Yamamoto et al. ............... 356/346
5,022,754 6/1991 Varnham .......................... 356/345

*Primary Examiner*—Samuel A. Turner
*Attorney, Agent, or Firm*—Halsey & Stass

[57] ABSTRACT

The invention provides an optical wavelength/frequency detection apparatus for detecting a wavelength of a frequency of a laser source, which is improved in that it eliminates a movable element to achieve a high degree of long term reliability and can detect a wavelength or a frequency of light with a high degree of accuracy with a high resolution while it is small in size. The optical wavelength/frequency detection apparatus comprises a pair of optical fibers for individually propagating two optical outputs of a measurement light splitting optical coupler, a driver for varying the relative difference between optical path lengths of two beams of light propagated in the optical fibers, a light receiver for receiving interference light of the measurement light from a measurement light combining optical coupler, and a counter for counting the number of interference pulses of the measurement light received by the light receiver. Measurement light information from the counter and reference light information are processed by comparison calculation processing to calculate a wavelength or a frequency of the measurement light.

55 Claims, 20 Drawing Sheets

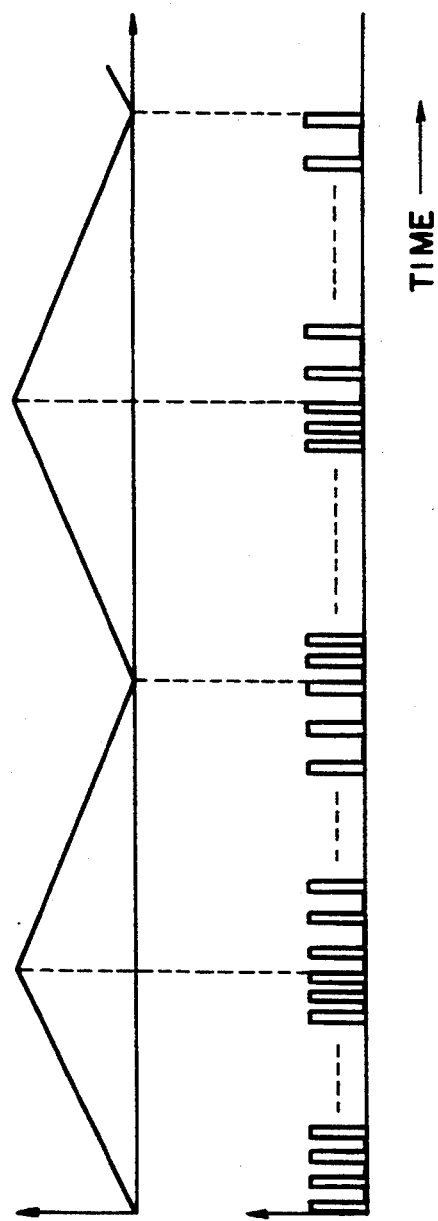

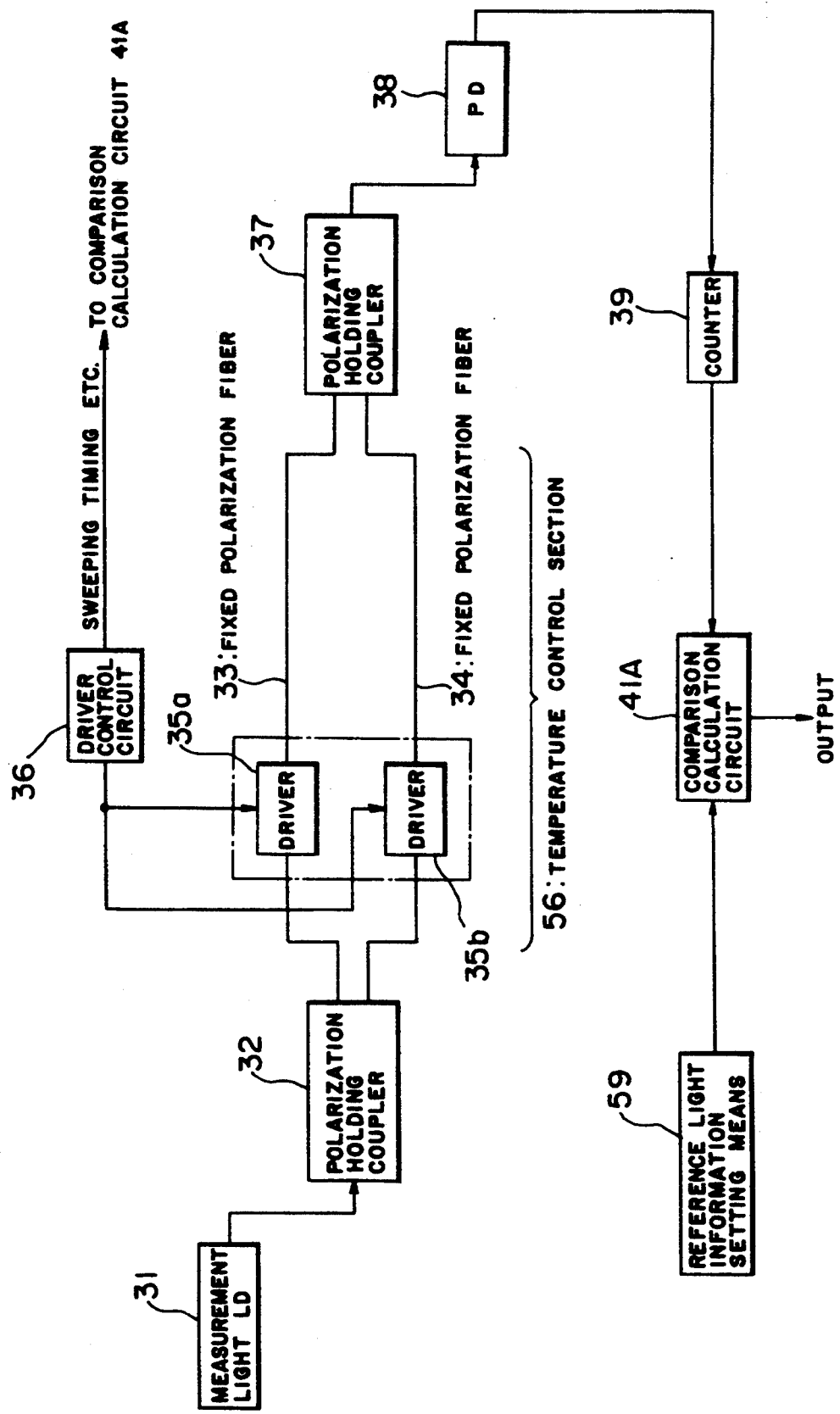

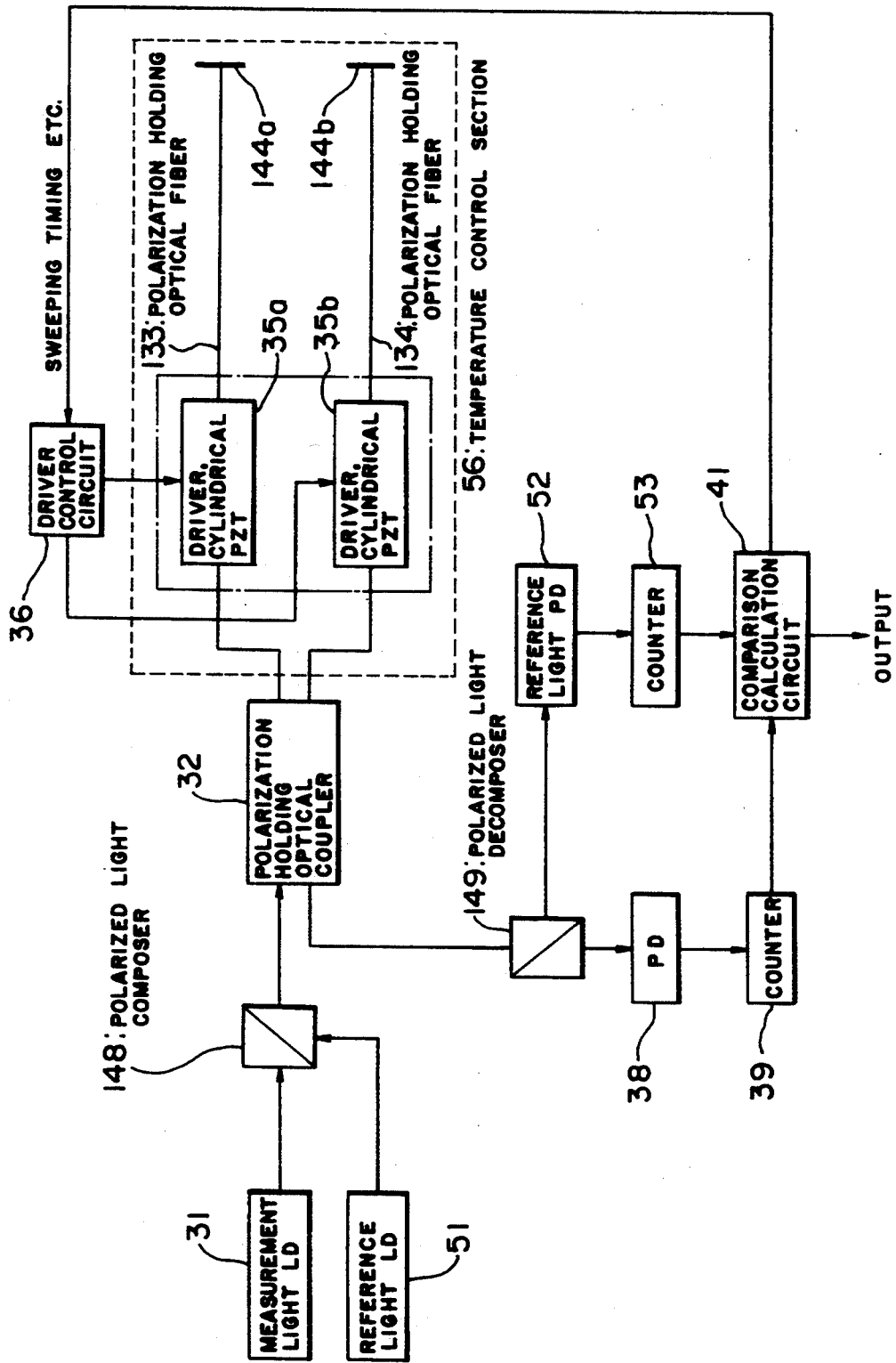

OPTICAL FIBER INTERFERENCE WAVELENGTH/FREQUENCY DETECTION APPARATUS WHICH ELIMINATES A MOVABLE ELEMENT

BACKGROUND OF THE INVENTION

1. Field of the Invention

This invention relates to an optical wavelength/frequency detection apparatus for detecting a wavelength or a frequency of a laser source.

2. Description of the Preferred Art

In recent years, it has been and is required in the fields of measurement and communication which make use of light to measure and detect a wavelength or a frequency of a laser source with a high degree of accuracy with a high resolution. For example, in an optical FDM transmission system, it is necessary to control the optical frequencies of a plurality of laser sources on the transmission side with a high degree of accuracy to arrange them on an optical frequency axis. However, the optical frequency of a laser source is subject to a variation from an external environment or aging. Therefore, the optical frequencies of the individual laser sources must be detected successively so that they may not be displaced from the values of them set at an initial stage. Accordingly, a wavelength (frequency) detection apparatus is required which can detect a wavelength (frequency) with a high degree of accuracy with a high resolution and is small in size and high in reliability.

FIG. 21 is a block diagram showing an optical wavelength/frequency detection apparatus which employs a Michelson interferometer. Referring to FIG. 21, the Michelson interferometer is denoted at 60 and includes a half mirror 53, a fixed mirror 64 and a movable mirror 65.

The half mirror 63 splits and combines light for measurement, that is, measurement light, and reference laser light. The fixed mirror 64 is fixed at a predetermined location in the Michelson interferometer 60. The movable mirror 65 is movable to vary the difference between the optical path lengths.

The optical wavelength/frequency detection apparatus includes, in addition to the Michelson interferometer 60, a fiber light inputting element 61 for inputting measurement light, and a collimator 62 for collimating incident light into parallel light.

The optical wavelength/frequency detection apparatus further includes an optical detector 66 for counting the number of interference pulses of measurement light, an amplifier (Amp) 67 for amplifying a signal from the optical detector 66, an analog to digital (A/D) converter 68 for converting an analog signal from the amplifier 67 into a digital signal, a fast Fourier transform (FFT) unit 69, and a spectrum display unit 70 for displaying a spectrum of light.

The optical wavelength/frequency detection apparatus further includes a He-Ne laser 71 for outputting a reference laser beam of a known wavelength, an optical detector 72 for counting the number of interference pulses of the reference laser beam, and a correction section 73 for adjusting the interval of a sampling signal.

In the optical wavelength/frequency detection apparatus of the construction, measurement light inputted from the fiber light inputting element 61 is introduced by way of the collimator 62 to the half mirror 63, by which it is split into two beams. The thus split two beams of measurement light are reflected by the fixed mirror 64 and the movable mirror 65, respectively, and then combined with each other by the half mirror 63. The optical path length difference then is produced by moving the movable mirror 65.

Interference pulses are thus produced from the two split beams of measurement light due to the optical path length difference and counted by the optical detector 66. The output of the optical detector 66 is amplified by the amplifier 67 and converted from an analog signal into a digital signal by the analog to digital converter 68.

Meanwhile, the He-Ne laser 71 outputs a reference laser beam of a known wavelength. The reference laser beam passes similar optical paths to those of the measurement light to produce interference pulses similarly. The interference pulses of the reference laser beam are counted by the optical detector 72. The output of the optical detector 72 is supplied as sampling interval information to the analog to digital converter 68 by way of the correction section 73.

The output of the analog to digital converter 68 is inputted to the fast Fourier transform unit 69, in which it is processed by required calculation processing. The output of the fast Fourier transform unit 69 is supplied to the spectrum display apparatus 70, on which a corresponding spectrum of light is displayed. The operator thus reads a wavelength or a frequency of the measurement light from the display.

The optical wavelength/frequency detection apparatus, however, has the following subjects to be solved for practical use since the optical system is constituted from parts of the bulk type. In particular, the optical wavelength/frequency detection apparatus has the subjects to be solved that the apparatus is large in size, that alignment of optical axes is difficult and that optical axes are displaced from each other by vibrations OF some other cause. Also it is a subject of the optical wavelength/frequency detection apparatus that it is low in long term reliability since a motor or a like element is used in order to feed the movable mirror.

SUMMARY OF THE INVENTION

It is an object of the present invention to provide an optical wavelength/frequency detection apparatus which eliminates a movable element to achieve a high degree of long term reliability and can detect a wavelength or a frequency of light with a high degree of accuracy with a high resolution while it is small in size.

In order to attain the object described above, according to an aspect of the present invention, there is provided an optical wavelength/frequency detection apparatus, which comprises a measurement light splitting optical coupler for splitting measurement light, a pair of optical fibers for propagating two optical outputs of the measurement light splitting optical coupler, a driver for varying the relative difference between optical path lengths of two light beams propagating in the optical fibers, driver control means for controlling the driving condition of the driver, a measurement light combining optical Coupler for combining the two beams of measurement light propagated in the optical fibers, light reception means for receiving interference light of the measurement light from the measurement light combining optical coupler, counting means for receiving the output of the light reception means and counting interference pulses of the measurement light received by the light reception means in response to operation of the driver, reference light information setting means for setting reference light information, and calculation means for receiving the outputs of the counting means and the reference light information setting means and processing the measurement light information and the reference light information by comparison calculation processing to calculate a wavelength or a frequency of the measurement light.

According to another aspect of the present invention, there is provided an optical wavelength/frequency detection apparatus, which comprises a measurement light splitting and reference light combining optical coupler for splitting measurement light and for combining reference light, a reference light splitting and measurement light combining optical coupler for splitting the reference light and for combining the measurement light, a pair of optical fibers interposed between the measurement light splitting and reference light combining optical coupler and the reference light splitting and measurement light combining optical coupler for propagating two optical outputs of each of the optical couplers, a driver for varying the relative difference between optical path lengths of two light beams propagated in the optical fibers, driver control means for controlling the driving condition of the driver, measurement interference light reception means for receiving interference light of the measurement light from the reference light splitting and measurement light combining optical coupler, reference interference light reception means for receiving interference light of the reference light from the measurement light splitting and reference light combining optical coupler, measurement interference light counting means for receiving the output of the measurement interference light reception means and counting the number of interference pulses of the measurement light received by the measurement interference light reception means in response to operation of the driver, reference interference light counting means for receiving the output of the reference interference light reception means and counting the number of interference pulses of the reference light received by the reference interference light reception means in response to operation of the driver, and calculation means for receiving the outputs of the measurement interference light counting means and the reference interference light counting means and processing the measurement light information and the reference light information by comparison calculation processing to calculate a wavelength or a frequency of the measurement light.

In the optical wavelength/frequency detection apparatus of the aspects of the present invention, each of the measurement light splitting optical coupler and the measurement light combining optical coupler may be constructed as a polarization holding coupler while each of the optical fibers is constructed as a fixed polarization fiber.

Any of the optical wavelength/frequency detection apparatus may further comprise optical fiber temperature stabilization means for keeping the temperature of each of the optical fibers at a desired temperature.

The counting means may count the number of interference pulses of the measurement light only during sweeping of the optical path length difference between the optical fibers by the driver in one direction.

Alternatively, the counting means may count the number of interference pulses of the measurement light during sweeping of the optical path length difference between the optical fibers by the driver in both of the going and returning paths.

In this instance, the calculation means may apply averaging processing to both of a wavelength or a frequency of the measurement light obtained from the number of interference pulses of the measurement light during sweeping of the optical path length difference between the optical fibers by the driver in the going path and a wavelength or a frequency of the measurement light obtained from the number of interference pulses of the measurement light during sweeping of the optical path length difference between the optical fibers by the driver in the returning path to calculate a wavelength or a frequency of the measurement light.

The driver may be provided for each of the optical fibers.

In this instance, the difference between the lengths of the optical fibers may be set greater than the width of variation of the optical path lengths of the optical fibers, and the driver control means may include means for causing each of the drivers to perform a push-pull operation.

Preferably, the driver control means controls the driver so that pulses of a pulse train arising from the interference light of the measurement light are displaced just or substantially at an equal interval from each other.

According to a further aspect of the present invention, there is provided an optical wavelength/frequency detection apparatus, which comprises a pair of optical fibers for receiving two optical outputs at first ends thereof and propagating the thus received optical outputs therethrough, a driver for varying the relative difference between optical path lengths of two light beams propagated in the optical fibers, driver control means for controlling the driving condition of the driver, reflection means for reflecting the light having propagated in the optical fibers at the other second ends of the optical fibers so that the light is introduced back into the corresponding ones of the optical fibers, a measurement light splitting and combining optical coupler for splitting measurement light into two beams and inputting the two beams into the first ends of the optical fibers and for combining the reflected measurement light outputted from the first ends of the optical fibers, light reception means for receiving interference light of the measurement light from the measurement light splitting and combining optical coupler, counting means for receiving the output of the light reception means and counting the number of interference pulses of the measurement light received by the light reception means in response to operation of the driver, reference light information setting means for setting reference light information, and calculation means for receiving the outputs of the counting means and the reference light information setting means and processing the measurement light information and the reference light information by comparison calculation processing to calculate a wavelength or a frequency of the measurement light.

According to a still further aspect of the present invention, there is provided an optical wavelength/frequency detection apparatus, which comprises polarized light composition means for composing measurement light and reference light so that the measurement light and the reference light may be mutually perpendicularly polarized light, a pair of polarization holding optical fibers for receiving the optical output of the polarized light composition means at first ends thereof and propagating the received polarized light therethrough while maintaining the polarizations of the polarized light, a driver for varying the relative difference between optical path lengths of the two light beams propagated in the polarization holding optical fibers, driver control means for controlling the driving condition of the driver, reflection means for reflecting the light having propagated in the polarization holding optical fibers at the other second ends of them so that the reflected light may be introduced into the corresponding ones of the polarization holding optical fibers, polarized light splitting and combining means interposed between the polarized light composition means and the polarization holding optical fibers for splitting the optical output of the polarized light composition means into two beams and inputting the two beams into the first ends of the polarization holding optical fibers and for combining the reflected light outputted from the first ends of the polarization holding optical fibers, polarized light decomposition means for decomposing the light combined by the polarized light splitting and combining means into two polarized light beams polarized perpendicularly to each other, measurement interference light reception means for receiving interference light of the measurement light decomposed by the polarized light decomposition means, reference interference light reception means for receiving interference light of the reference light decomposed by the polarization light decomposition means, measurement interference light counting means for receiving the output of the measurement interference light reception means and counting the number of interference pulses of the measurement light received by the measurement interference light reception means in response to operation of the driver, reference interference light counting means for receiving the output of the reference interference light reception means and counting the number of interference pulses of the reference light received by the reference interference light reception means in response to operation of the driver, and calculation means for receiving the outputs of the measurement interference light counting means and the reference interference light counting means and processing the measurement light information and the reference light information by comparison calculation processing to calculate a wavelength or a frequency of the measurement light.

In both of the optical wavelength/frequency detection apparatus, the reflection means may be constructed together with an optical non-reciprocal element located adjacent the second ends of the polarization holding optical fibers for rotating the polarization direction by 45°+90° x m, m being 0, 1, 2, ...

Alternatively, the reflection means may be constructed together with a quarter wavelength member located adjacent the second ends of the polarization holding optical fibers and having optical axes inclined by 45° with respect to a stress applying direction of the polarization holding optical fibers.

Or else, the reflection means is constructed as a reflection mirror located adjacent the second ends of the polarization holding optical fibers and having a predetermined reflection factor.

According to a yet further aspect of the present invention, there is provided an optical wavelength/frequency detection apparatus, which comprises a fixed polarization fiber for dividing measurement light of into two biaxial light components polarized perpendicularly to each other and providing a relative delay to the two biaxial light components, a driver for varying the delay amount between the two biaxial light components in the fixed polarization fiber, driver control means for controlling the driving condition of the driver, polarization means for combining the two biaxial light components outputted from the fixed polarization fiber to output interference light of the measurement light, light reception means for receiving interference light of the measurement light from the polarization means, counting means for receiving the output of the light reception means and counting the number of interference pulses of the measurement light received by the light reception means in response to operation of the driver, reference light information setting means for setting reference light information, and calculation means for receiving the outputs of the counting means and the reference light information setting means and processing the measurement light information and the reference light information by comparison calculation processing to calculate a wavelength or a frequency of the measurement light.

According to a yet further aspect of the present invention, there is provided an optical wavelength/frequency detection apparatus, which comprises a fixed polarization fiber for dividing each of measurement light and reference light into two biaxial light components polarized perpendicularly to each other and providing a relative delay between the two biaxial light components, a driver for varying the delay amount between the two biaxial light components in the fixed polarization fiber, driver control means for controlling the driving condition of the driver, first polarization means for combining the two biaxial light components outputted from the fixed polarization fiber to output interference light of the measurement light, second polarization means for combining the two biaxial light components outputted from the fixed polarization fiber to output interference light of the reference light, measurement interference light reception means for receiving interference light of the measurement light from the first polarization means, reference interference light reception means for receiving interference light of the reference light from the second polarization means, measurement interference light counting means for receiving the output of the measurement interference light reception means and counting the number of interference pulses of the measurement light received by the measurement interference light reception means in response to operation of the driver, reference interference light counting means for receiving the output of the reference interference light reception means and counting the number of interference pulses of the reference light received by the reference interference light reception means in response to operation of the driver, and calculation means for receiving the outputs of the measurement interference light counting means and the reference interference light counting means and processing the measurement light information and the reference light information by comparison calculation processing to calculate a wavelength or a frequency of the measurement light.

Both of the optical wavelength/frequency detection apparatus may further comprise a second fixed polarization fiber having a similar characteristic and a similar length to those of the first-mentioned fixed polarization fiber and connected to the first fixed polarization fiber such that the axes of them extend perpendicularly with each other.

They may further comprise a second driver for varying the delay amount of two biaxial light components in the second fixed polarization fiber, and second driver control means for controlling the driving condition of the second driver.

They may further comprise optical fiber temperature stabilization means for keeping the temperature of the fixed polarization fiber at a desired temperature.

Or, they may further comprise optical fiber temperature stabilization means for keeping the temperatures of the fixed polarization optical fiber and the second fixed polarization fiber at a desired temperature.

Preferably, the driver control means controls the driver so that pulses of a pulse train arising from the interference light of the measurement light are displaced just or substantially at an equal interval from each other.

Or, the driver control means and the second driver control means may control the driver and the second driver, respectively, so that pulses of a pulse train arising from the interference light of the measurement light are displaced just or substantially at an equal interval from each other.

With the optical wavelength/frequency detection apparatus of the present invention, the following effects or advantages can be attained.

1. Since the optical path length difference can be varied making use of any of various optical effects without using a part of the bulk type, a movable part can be eliminated, and consequently, the optical wavelength/frequency detection apparatus of any of the first to sixth aspects of the present invention can detect a wavelength or a frequency of measurement light with a high degree of reliability and accuracy and with a high resolution for a long period of time while it is small in size.

2. Where a polarization holding coupler and a fixed polarization fiber are employed, polarization of light can be maintained, and consequently, a variation in intensity of interference light caused by a fluctuation in polarization between two paths is eliminated and stabilized wavelength detection can be achieved.

3. Where optical fiber temperature stabilization means is provided for keeping the temperature of each optical fiber at a desired temperature, such a situation can be reduced considerably that the optical path length difference of the fiber is varied by a variation of the temperature of the external environment other than optical path length difference sweeping by the driver.

4. Where averaging processing is applied to both of a wavelength or a frequency of measurement light calculated from the number of interference pulses of the measurement light during sweeping of the optical path length difference between optical fibers by a driver in the going path and a wavelength or a frequency of the measurement light calculated from the number of interference pulses of the measurement light during sweeping of the optical path length difference between the optical fibers by the driver in the returning path to calculate a wavelength or a frequency of the measurement light, the accuracy in measurement can be enhanced, and consequently, the error in measurement caused by a drift can be decreased.

5. Where signals of a signal train originating from interference light may have an equal or substantially equal time interval from each other, the accuracy in counting is enhanced.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 11(a) and 11(b) are waveform diagrams illustrating another optical path length difference sweeping;

FIG. 14 is a block diagram of another optical wavelength/frequency detection apparatus showing a second preferred embodiment of the present invention;

FIG. 15 is a block diagram of a further optical wavelength/frequency detection apparatus showing a third preferred embodiment of the present invention;

DESCRIPTION OF THE PREFERRED EMBODIMENTS a. Aspects of the Invention

Figure 1:
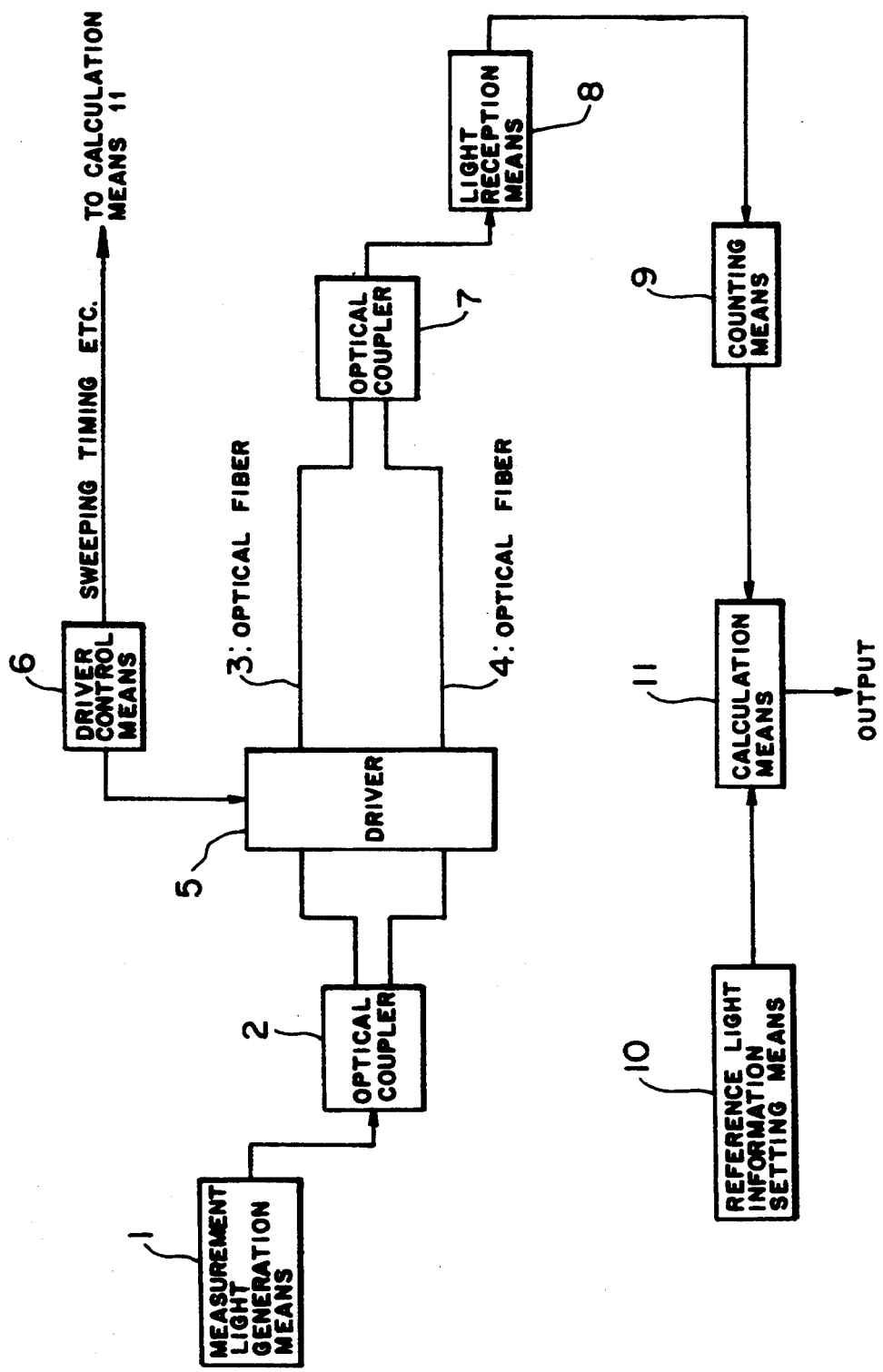
FIG. 1 is a block diagram illustrating the first aspect of the present invention.

FIG. 1 illustrates the first aspect of the present invention. Referring to FIG. 1, the optical wavelength/frequency detection apparatus includes measurement light generation means 1, and a measurement light splitting optical coupler 2 for splitting measurement light from the measurement light generation means 1.

A pair of optical fibers 3 and 4 propagate the two optical outputs of the measurement light splitting optical coupler 2.

A driver 5 varies the relative difference between the lengths of optical paths of two light beams propagating in the optical fibers 3 and 4. Driver control means 6 controls the driving condition of the driver 5.

A measurement light combining optical coupler 7 combines measurement light beams having propagated in the optical fibers 3 and 4. Light reception means 8 receives interference light of the measurement light from the measurement light combining coupler 7.

Counting means 9 receives the output of the light reception means 8 and counts the number of interference pulses of the measurement light received by the light reception means 8 in response to operation of the driver 5.

Reference light information setting means 10 sets reference light information.

Calculation means 11 receives the outputs of the counting means 9 and the reference light information setting means 10 and performs comparison calculation processing of the measurement light information and the reference light information to calculate a wavelength of a frequency of the measurement light.

In the optical wavelength/frequency detection apparatus according to the first aspect of the present invention, measurement light from the measurement light generation means 1 is split into two beams by the measurement light splitting coupler 2, and the two optical outputs of the measurement light splitting optical coupler 2 are introduced into and propagated in the optical fibers 3 and 4.

In this instance, the driver 5 provides, under the control of the driver control means 6, a relative difference between optical path lengths of the two light beams propagated in the optical fiber 3 and 4.

The measurement light beams having propagated in the optical fibers 3 and 4 in this manner are combined by the measurement light combining optical coupler 7, and interference light between the measurement light beams is received by the light reception means 8. The counting means 9 receives the output of the light reception means 8 and counts the number of interference pulses of the measurement light received by the light reception means 8 in response to operation of the driver 5. The result of the counting operation of the counting means 8 is inputted to the calculation means 11, by which comparison calculation processing between the measurement light information and the reference light information is performed to calculate a wavelength or a frequency of the measurement light.

Figure 2:
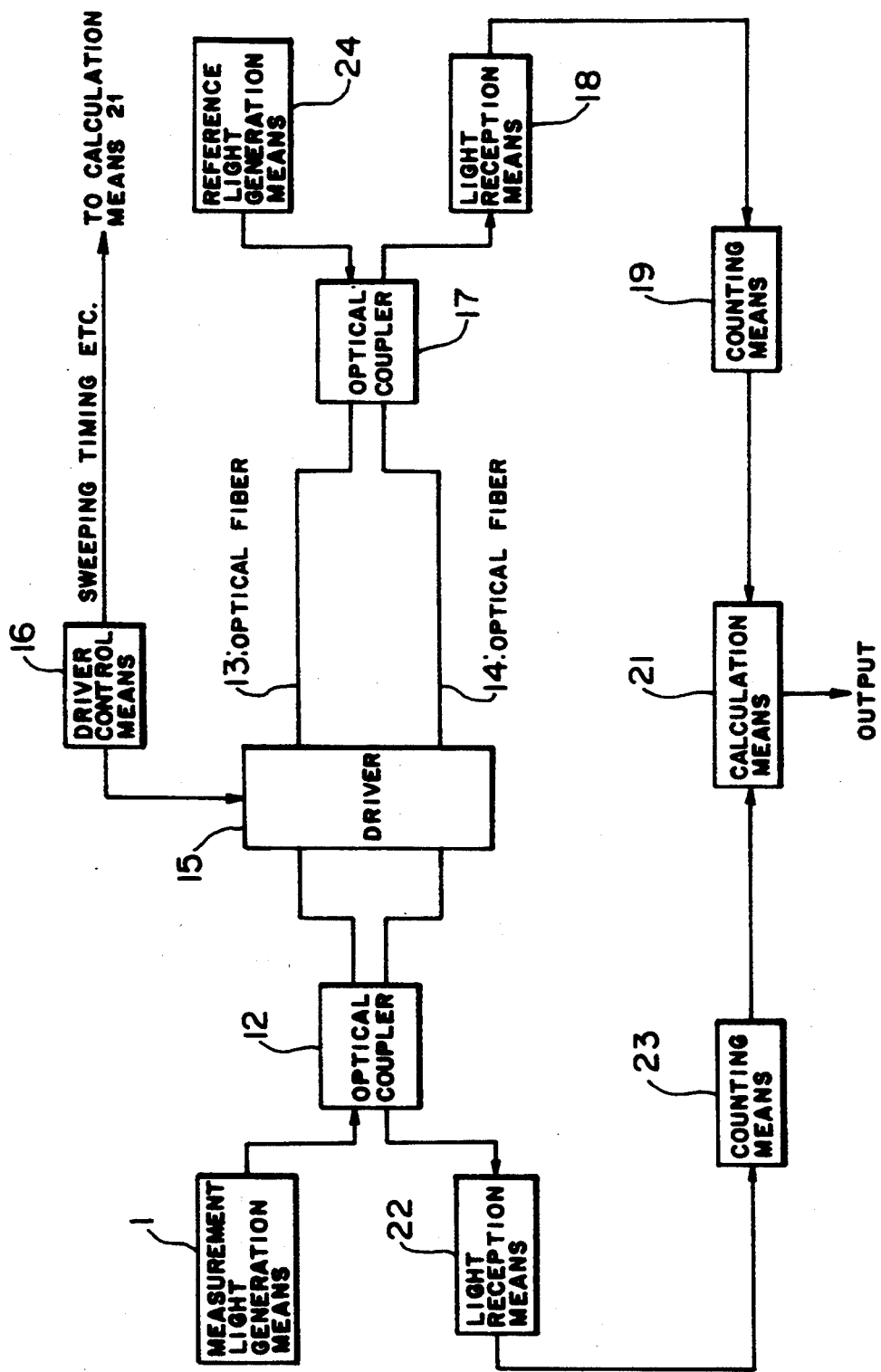
FIG. 2 is a block diagram but illustrating the second aspect of the present invention.

Referring now to FIG. 2, the second aspect of the present invention is illustrated. The optical wavelength/frequency detection apparatus includes measurement light generation means 1, reference light generation means 24, and a measurement light splitting and reference light combining optical coupler 12 for splitting measurement light from the measurement light generation means 1 and for combining reference light.

A reference light splitting and measurement light combining optical coupler 17 splits reference light from the reference light generation means 24 and combines measurement light.

A pair of optical fibers 13 and 14 are interposed between the measurement light splitting and reference light combining optical coupler 12 and the reference light splitting and measurement light combining coupler 17 for propagating the two optical outputs of each of the optical couplers 12 and 17 therein.

A driver 15 varies the relative difference between optical path lengths of two light beams propagating in the optical fibers 13 and 14. Driver control means 16 controls the driving condition of the driver 15.

Measurement interference light reception means 18 receives interference light of measurement light from the reference light splitting and measurement light combining optical coupler Reference interference light reception means 22 receives interference light of reference light from the measurement light splitting and reference light combining optical coupler 12.

Measurement interference light counting means 19 receives the output of the measurement interference light reception means 18 and counts the number of interference pulses of measurement light received by the measurement interference light reception means 18 in response to operation of the driver 15.

Reference interference light counting means 23 receives the output of the reference interference light reception means 22 and counts the number of interference pulses of reference light received by the reference interference light reception means 22 in response to operation of the driver 15.

Calculation means 21 receives the outputs of the measurement interference light calculation means 19 and the reference interference light measurement means 23 and performs comparison calculation processing of the measurement light information and the reference light information to calculate a wavelength or a frequency of the measurement light.

In the optical wavelength/frequency detection apparatus according to the second aspect of the present invention, measurement light from the measurement light generation means 1 is split into two light beams by the measurement light splitting and reference light combining optical coupler 12 while two light beams of reference light are combined into a single reference light beam, and reference light from the reference light generation means 24 is split into two light beams by the reference light splitting and measurement light combining optical coupler 17 while two light beams of measurement light are combined into a single light beams for measurement.

The two optical outputs of each of the optical couplers 12 and 17 are propagated in the optical fibers 13 and 14 in pair.

The driver 15 provides a relative difference between optical path lengths of the two light beams propagated in the optical fibers 13 and 14, and the driving condition of the driver 15 then is controlled by the driver control means 16.

Interference light of the measurement light from the reference light splitting and measurement light combining optical coupler 17 is received by the measurement interference light reception means 18 while interference light of the reference light from the measurement interference light splitting and reference light combining optical coupler 12 is received by the reference interference light reception means 22.

The measurement interference light counting means 19 receives the output of the measurement interference light reception means 18 and counts the number of interference pulses of the measurement light received by the measurement interference light reception means 18 in response to operation of the driver 15 while the reference interference light counting means 23 receives the output of the reference interference light reception means 22 and counts the number of interference pulses of the reference light received by the reference interference light reception means 22 in response to operation of the driver 15.

The calculation means 21 receives the outputs of the measurement interference light counting means 19 and the reference interference light counting means 23 and performs comparison calculation processing of the measurement light information and the reference light information to calculate a wavelength or a frequency of the measurement light.

Figure 3:
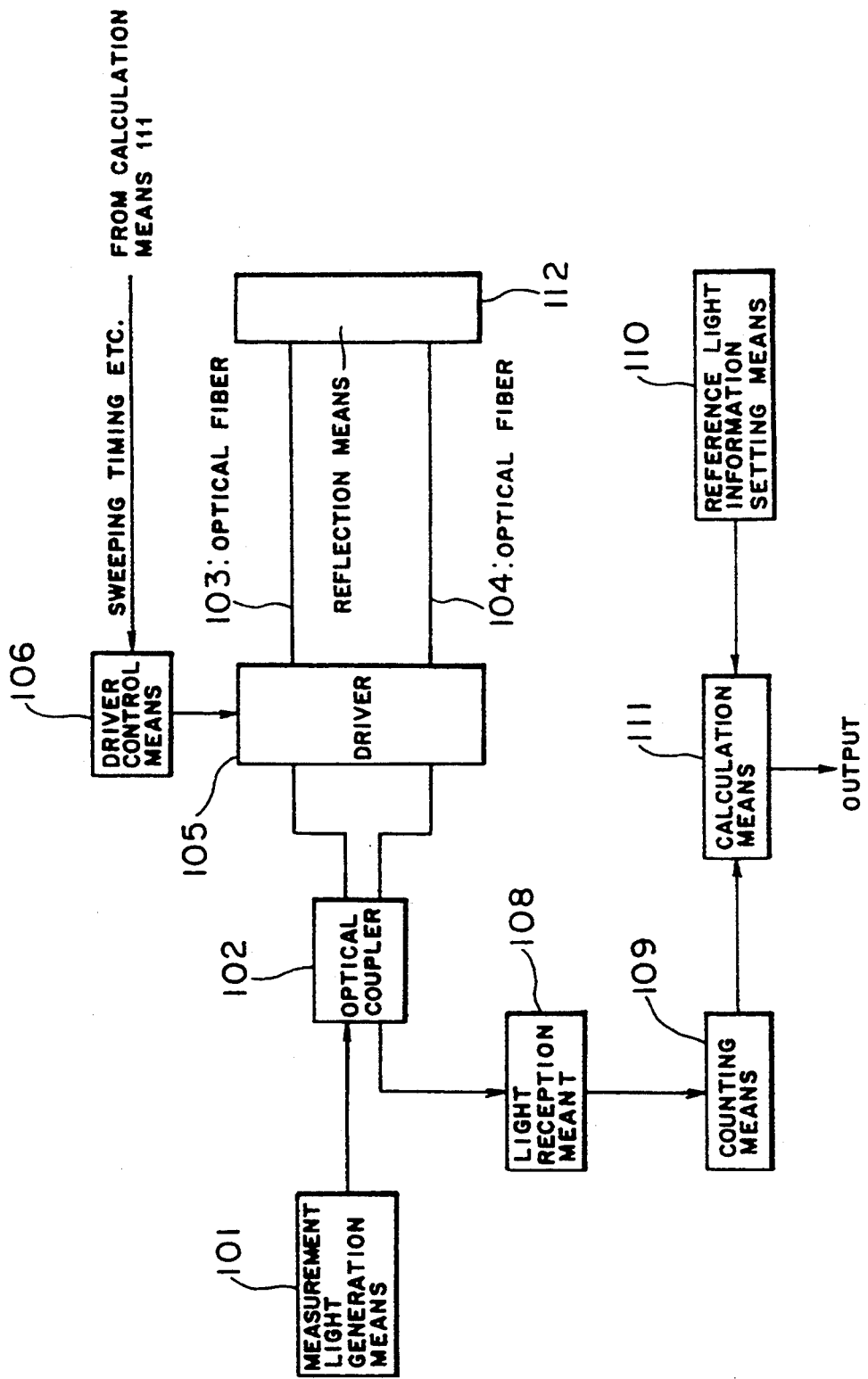
FIG. 3 is a block diagram but illustrating the third aspect of the present invention.

Referring now to FIG. 3, the third aspect of the present invention is illustrated. The optical wavelength/frequency detection apparatus includes a pair of optical fibers 103 and 104 for receiving two optical outputs at each ends thereof and propagating the thus received optical outputs therethrough.

A driver 105 varies the relative difference between optical path lengths of two light beams propagated in the optical fibers 103 and 104.

Driver control means 106 controls the driving condition of the driver 105.

Reflection means 112 reflects light having propagated thereto in the optical fibers 103 and 104 at the opposite ends of them back into the corresponding optical fibers 103 and 104.

A measurement light splitting and combining optical coupler 102 splits measurement light from measurement light generation means 101 into two beams of light and introduces the two beams of light into the opposing ends of the optical fibers 103 and 104. Further, the measurement light splitting and combining optical coupler 102 combines reflected measurement light beams outputted from the opposing ends of the optical fibers 103 and 104.

Light reception means 108 receives interference light of measurement light from the measurement light splitting and combining optical coupler 102.

Counting means 109 receives the output of the light reception means 108 and counts the number of interference pulses of measurement light received by the light reception means 108.

Reference light information setting means 110 sets reference light information.

Calculation means 111 receives the outputs of the counting means 109 and the reference light information setting means 110 and performs comparison calculation processing of the measurement light information and the reference light information to calculate a wavelength or a frequency of the measurement light.

In the optical wavelength/frequency detection apparatus according to the third aspect of the present invention, measurement light from the measurement light generation means 101 is split into two light beams by the measurement light splitting and combining optical coupler 102, and the two optical outputs of the measurement light splitting optical coupler 102 are introduced into and propagated in the optical fibers 103 and 104 in pair.

In this instance, the driver 105 provides a relative difference between optical path lengths of the two light beams propagated in the optical fibers 103 and 104 under the control of the driver control means 106.

The light beams having propagated in the optical fibers 103 and 104 are reflected at the opposite ends of the optical fibers 103 and 104 by the reflection means 112 and introduced back into the corresponding optical fibers 103 and 104.

The reflected measurement light beans having propagated back in the optical fibers 103 and 104 in this manner are combined into a single beam by the measurement light splitting and combining optical coupler 102, and interference light of the measurement light is outputted from the measurement light splitting and combining optical coupler 102 and received by the light reception means 108. The counting means 109 receives the output of the light reception means 108 and counts the number of interference pulses of the measurement light received by the light reception means 108 in response to operation of the driver 105. The result of the counting operation is inputted to the calculation means 111, in which comparison calculation processing of the measurement light information and the reference light information is performed to calculate a wavelength or a frequency of the measurement light.

Figure 4:
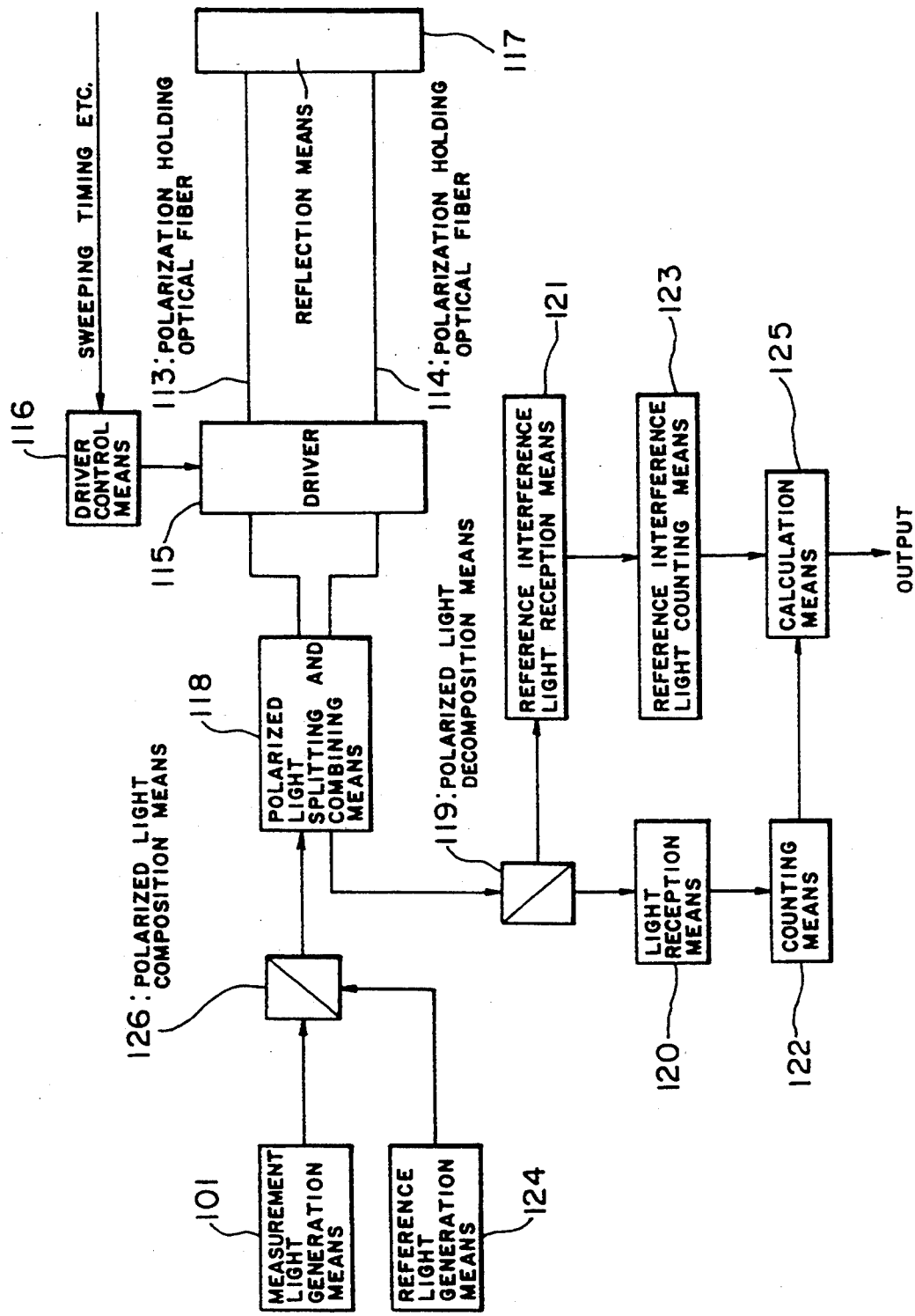
FIG. 4 is a block diagram but illustrating the fourth aspect of the present invention.

Referring now to FIG. 4, the fourth aspect of the present invention is illustrated. The optical wavelength/frequency detection apparatus includes polarized light composition means 126 which composes measurement light from measurement light generation means 101 and reference light from reference light generation means 124 so that they may make perpendicularly polarized light relative to each other.

A pair of polarization holding optical fibers 113 and 114 receive, at first ends thereof, the optical output of the polarized light composition means 126 and propagate the optical output while maintaining the polarization of it.

A driver 115 varies the relative difference between optical path lengths of two light beams propagated in the polarization holding optical fibers 113 and 114.

Driver control means 116 controls the driving condition of the driver 115.

Reflection means 117 reflects light having propagated thereto along the polarization holding optical fibers 113 and 114 at the other second ends of them to return the light back into the corresponding polarization holding optical fibers 113 and 114.

Polarized light splitting and combining means 118 is interposed between the polarized light composition means 126 and the polarization holding optical fibers 113 and 114 and splits the optical output of the polarized light composition means 126 into two light beams so that they may be inputted into the first ends of the polarization holding optical fibers 113 and 114. Further, the polarized light splitting and combining means 118 combines reflected light beams outputted from the first ends of the polarization holding optical fibers 113 and 114.

Polarized light decomposition means 119 decomposes light, which has been combined by the polarized light splitting and combining means 118, into two light beams polarized perpendicularly to each other.

Measurement interference light reception means 120 receives interference light of measurement light decomposed by the polarized light decomposition means 119.

Reference interference light reception means 121 receives interference light of reference light decomposed by the polarized light decomposition means 119.

Measurement interference light counting means 122 receives the output of the measurement interference light reception means 120 and counts the number of interference pulses of measurement light received by the measurement interference light reception means 120 in response to operation of the driver 115.

Reference interference light counting means 123 receives the output of the reference interference light reception means 121 and counts the number of interference pulses of reference light received by the reference interference light reception means 121 in response to operation of the driver 115.

Calculation means 125 receives the outputs of the measurement interference light counting means 122 and the reference interference light counting means 123 and performs comparison calculation processing of the measurement light information and the reference light information to calculate a wavelength or a frequency of the measurement light.

In the optical wavelength/frequency detection apparatus according to the fourth aspect of the present invention having the construction described above, measurement light from the measurement light generation means 101 and reference light from the reference light generation means 124 are combined by the polarized light composition means IEO so that they may be beams of light polarized perpendicularly to each other.

The optical output of the polarized light composition means 126 is split into two beams of light by the polarized light splitting and combining means 118 interposed between the polarized light combining means 118 and the polarization holding optical fibers 113 and 114, and the thus split two light beams are introduced into the first ends of the polarization holding optical fibers 113 and 114 and propagated in the polarization holding optical fibers 113 and 114 while maintaining the polarization conditions thereof.

The driver 115 varies the relative difference between optical path lengths of the two light beams propagated in the polarization holding optical fibers 113 and 114, and the driving condition of the driver 115 then is controlled by the driver control means 116.

The light beams having propagated in the polarization holding optical fibers 113 and 114 are reflected at the second ends of the polarization holding optical fibers 113 and 114 by the reflection means so that they are introduced back into the corresponding polarization holding optical fibers 113 and 114. The reflected light beams are thus outputted from the first ends of the polarization holding optical fibers 113 and 114 and combined by the polarized light splitting and combining means 118.

The light thus combined by the polarized light splitting and combining means 118 is decomposed into two perpendicularly polarized light beams by the polarized light decomposition means 119.

Of the polarized light beams decomposed by the polarized light decomposition means 119, the interference light of the measurement light is received by the measurement interference light reception means 120 while the interference light of the reference light is received by the reference interference light reception means 121.

The measurement interference light counting means 122 receives the output of the measurement interference light reception means 120 and counts the number of interference pulses of the measurement light received by the measurement interference light reception means 120 in response to operation of the driver 115 while the reference interference light counting means 123 receives the output of the reference interference light reception means 121 and counts the number of interference pulses of the reference light received by the reference interference light reception means 121 in response to operation of the driver 115.

The calculation means 125 receives the outputs of the measurement interference light counting means 122 and the reference interference light counting means 123 and performs comparison calculation processing of the measurement light information and the reference light information to calculate a wavelength or a frequency of the measurement light.

The optical couplers 2, 7, 12, 17, 102 of the optical wavelength/frequency detection apparatus according to the first to fourth aspects of the present invention described above may be constructed from polarization holding couplers, and the optical fibers 3, 4, 13, 14. 103 and 104 may be constructed from fixed polarization fibers. In this instance, propagation of light occurs while its polarization condition is maintained.

Meanwhile, the reflection means 117 may be located at the second ends of the polarization holding optical fibers 113 and 114 and constructed together with an optical non-reciprocal element which rotates the direction of polarization by $45° + 90° \times m$ ($m = 0, 1, 2, ...$). In this instance, the optical non-reciprocal element rotates the direction of polarization by $45° + 90° \times m$ ($m = 0, 1, 2, ...$), and light beams having propagated in the polarization holding optical fibers 113 and 114 are reflected at the second ends of the polarization holding optical fibers 113 and 114. Consequently, the direction of polarization is rotated twice and hence by $90° + 180° \times m$ ($m = 0, 1, 2, ...$) and the light beams having the thus rotation polarization planes are introduced back into the corresponding polarization holding optical fibers 113 and 114. It is to be noted that the fixed polarization fiber here signifies the same as the polarization holding optical fiber, and both of them propagate light while maintaining the polarization plane of the same.

Alternatively, the reflection means 117 may be located at the second ends of the polarization holding optical fibers 113 and 114 and constructed together with a quarter wavelength member having an optical axis inclined by 45° with respect to the stress applying direction of the polarization holding optical fibers 113 and 114. In this instance, light beams having propagated in the polarization holding optical fibers 113 and 114 are reflected at the second ends of the polarization holding optical fibers 113 and 114 and rotated in polarization direction by 90° by the quarter wavelength member and then introduced back into the corresponding polarization holding optical fibers 113 and 114.

The reflection means 112 or 117 may be located at the second ends of the polarization holding optical fibers 103 and 104 or 113 and 114 and constructed as a reflection mirror having a predetermined reflection factor. In this instance, light beams having propagated in the polarization holding optical fibers 103 and 104 or 113 and 114 are reflected at the second ends of the polarization holding optical fibers 103 and 104 or 113 and 114 by the reflection mirror and introduced back into the corresponding polarization holding optical fibers 103 and 104 or 113 and 114.

Further, optical fiber temperature stabilization means for keeping the temperature of each of the optical fibers 3. 4, 13, 14. 103, 104. 113 and 114 at a desired temperature may be provided. In this instance, the temperature of the optical fibers 3 and 4, 13 and 14, 103 and 104 or 113 and 114 can be maintained at a desired temperature by the optical temperature stabilization means.

Each of the counting means 9. 19, 23, 109, 122 and 123 may count the number of interference pulses of measurement light only during sweeping of the optical path length difference between the optical fibers 3 and 4. 13 and 14, 103 and 104 or 113 and 114 by the driver 5, 15, 105 or 115 in one direction or alternatively may count the number of interference pulses of the measurement light during sweeping of the optical path length difference between the optical fibers 3 and 4, and 14, 103 and 104 or 113 and 114 by the driver 5, 15, 105 or 115 in both of the going and returning paths.

Each of the calculation means 11, 21, 111 and 125 may apply averaging processing to both of a wavelength or a frequency of the measurement light calculated from the number of interference pulses of the measurement light during sweeping of the optical path length difference between the optical fibers 3 and 4, 13 and 14, 103 and 104 or 113 and 114 by the driver 5. 15, 105 or 115 in the going path and a wavelength or a frequency of the measurement light calculated from the number of interference pulses of the measurement light during sweeping of the optical path length difference between the optical fibers 3 and 4, 13 and 14, 103 and 104 or 113 and 114 by the driver 5, 15, 105 or 115 in the returning path to calculate a wavelength or a frequency of the measurement light.

The driver 5, 15, 105 or 115 may be provided for each of the optical fibers 3 and 4, 13 and 14, 103 and 104 or 113 and 114.

In this instance, the difference between the lengths of the optical fibers 3 and 4. 13 and 14, 103 and 104 or 113 and 114 may be set greater than the width of variation of the optical path lengths of the optical fibers 3 and 4, 13 and 14. 103 and 104 or 113 and 114, and the driver control means may include means for causing each of the drivers 5. 15, 105 and 115 to perform a push-pull operation.

Each of the driver control means 6, 16, 106 and 116 may control the driver 5, 15, 105 or 115 so that pulses of a pulse train arising from the interference light of the measurement light may have an equal or a substantially equal interval from each other.

Figure 5:
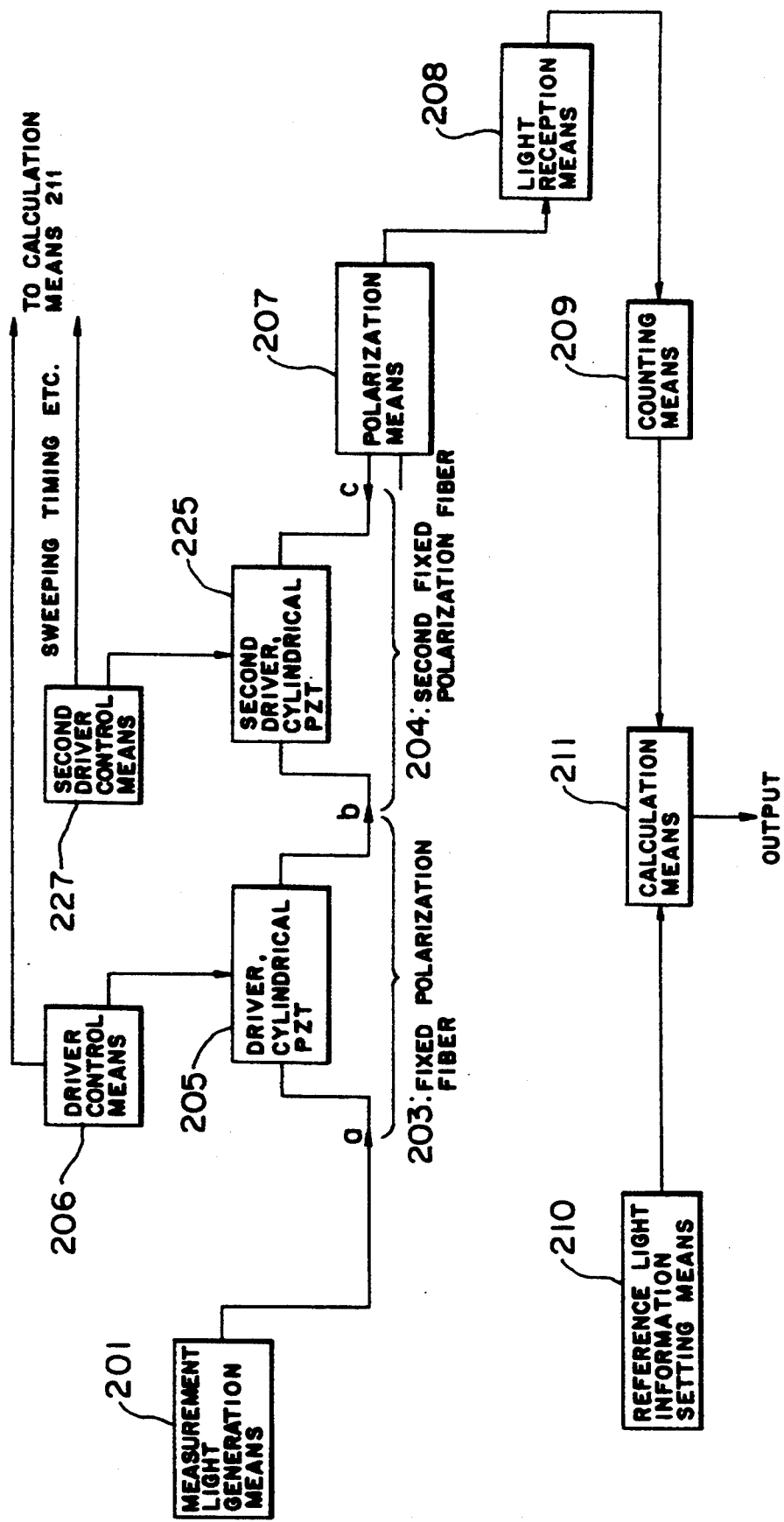
FIG. 5 is a block diagram but illustrating the fifth aspect of the present invention.

FIG. 5 illustrates the fifth aspect of the present invention. Referring to FIG. 5, a fixed polarization fiber 203 splits measurement light from measurement light generation means 201 into two light components polarized perpendicularly to each other and relatively delays the two polarized light components.

A driver 205 varies the delay amount between two polarized light components in the fixed polarization fiber 203.

Driver control means 208 controls the driving condition of the driver 205.

Polarization means 207 combines two polarized light components outputted from the fixed polarization fiber 203 and outputs them as interference light of the measurement light.

Light reception means 208 receives interference light of measurement light from the polarization means 207.

Counting means 209 receives the output of the light reception means 208 and counts the number of interference pulses of measurement light received by the light reception means 208 in response to operation of the driver 205.

Reference light information setting means 210 sets reference light information.

Calculation means 211 receives the outputs of the counting means 209 and the reference light information setting means 210 and performs comparison calculation processing of the measurement light information and the reference light information to calculate a wavelength or a frequency of measurement light.

In the optical wavelength/frequency detection apparatus according to the fifth aspect of the present invention having the construction described above, measurement light from the measurement light generation means 201 is divided into two biaxial light components polarized perpendicularly to each other and a relative delay is provided between the two biaxial light components by the fixed polarization fiber 203.

While the delay amount between the two biaxial light components in the fixed polarization fiber 203 is varied by the driver 205, the driving condition of the driver 205 is controlled by the driver control means 206.

Then, the two biaxial light components are outputted from the fixed polarization fiber 203 and combined by the polarization means 207 so that they are outputted as interference light of the measurement light.

The interference light of the measurement light from the polarization means 207 is received by the light reception means 208.

The counting means 209 receives the output of the light reception means 208 and counts the number of interference pulses of the measurement light received by the light reception means 208 in response to operation of the driver 205.

The calculation means 211 receives the outputs of the counting means 209 and the reference light information setting means 210, which is provided for setting reference light information, and processes the measurement light information and the reference light information by comparison calculation processing to calculate a wavelength or a frequency of the measurement light.

Figure 6:
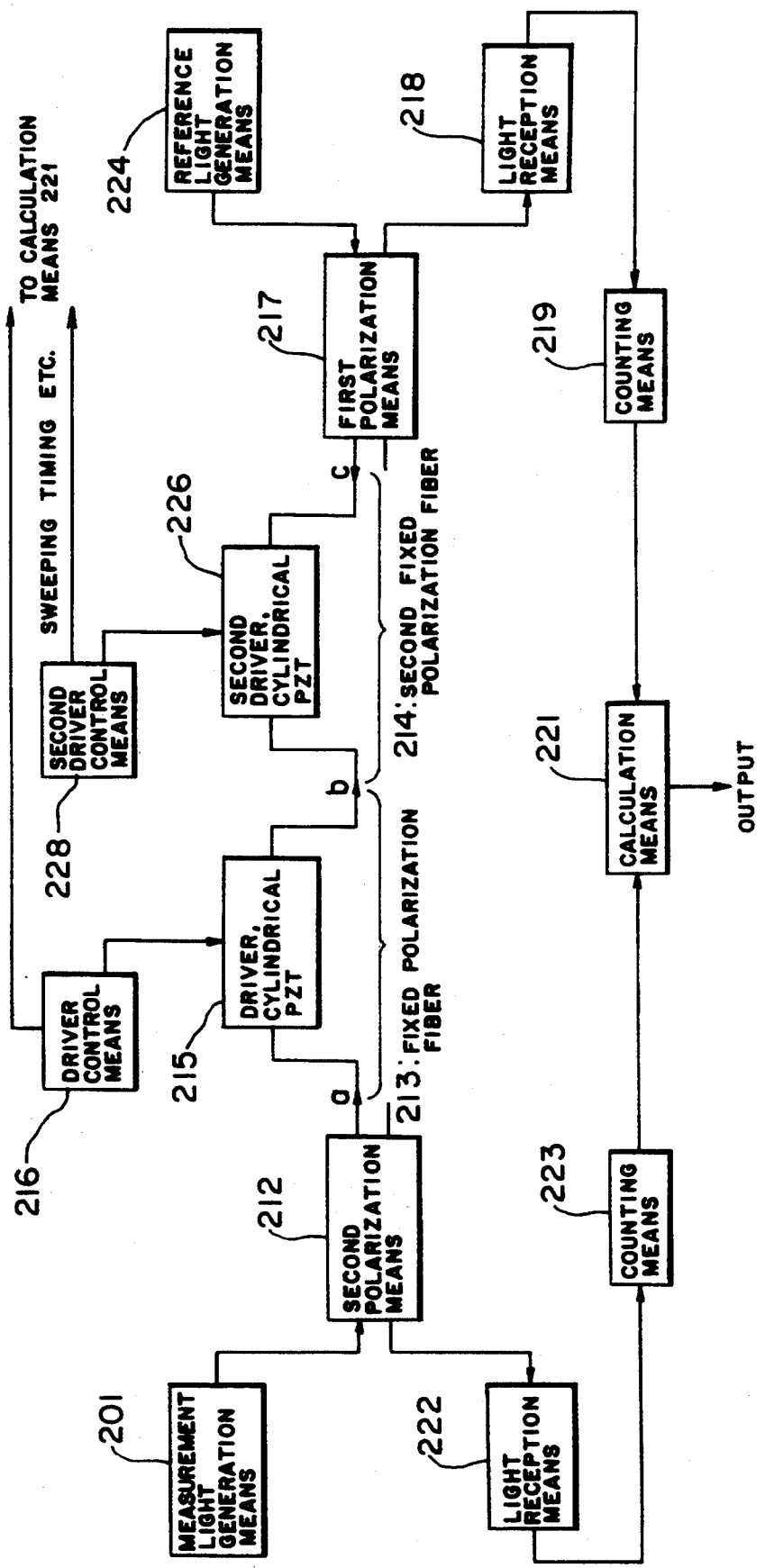
FIG. 6 is a block diagram but illustrating the sixth aspect of the present invention.

FIG. 6 illustrates the sixth aspect of the present invention. Referring to FIG. 6, a fixed polarization fiber 213 splits each of measurement light from measurement light generation means 201 and reference light from reference light generation means 224 into two light components polarized perpendicularly to each other and relatively delays the two polarized light components.

A driver 215 varies the delay amount between two polarized light beams in the fixed polarization fiber 213.

Driver control means 216 controls the driving condition of the driver 215.

First polarization means 217 combines two perpendicularly polarized light components outputted from the fixed polarization fiber 213 and outputs them as interference light of the measurement light.

Second polarization means 212 combines two perpendicularly polarized light components outputted from the fixed polarization fiber 213 and outputs them as interference light of the reference light.

Measurement interference light reception means 218 receives interference light of measurement light from the first polarization means 217.

Reference interference light reception means 222 receives interference light of reference light from the second polarization means 212.

Measurement interference light counting means 219 receives the output of the measurement interference light reception means 218 and counts the number of interference pulses of the measurement light received by the measurement interference light reception means 218 in response to operation of the driver 215.

Reference interference light counting means 223 receives the output of the reference interference light reception means 222 and counts the number of interference pulses of reference light received by the reference interference light reception means 222 in response to operation of the driver 215.

Calculation means 221 receives the outputs of the measurement interference light counting means and the reference interference light counting means 223 and performs comparison calculation processing of the measurement light information and the reference light information to calculate a wavelength or a frequency of measurement light.

In the optical wavelength/frequency detection apparatus according to the sixth aspect of the present invention having the construction described above, each of measurement light and reference light is divided into two biaxial light components polarized perpendicularly to each other and a relative delay is provided between the two biaxial light components by the fixed polarization fiber 213.

While the delay amount between the two biaxial light components in the fixed polarization fiber 213 is varied by the driver 215, the driving condition of the driver 215 is controlled by the driver control means 216.

Then, the two biaxial light components are outputted from the fixed polarization fiber 213 and combined by the first polarization means 217 so that they are outputted as interference light of the measurement light. The two biaxial light components are combined also by the second polarization means 212 so that they are outputted as interference light of the reference light.

The interference light of the measurement light from the first polarization means 217 is received by the measurement interference light reception means 218 while the interference light of the reference light from the second polarization means 212 is received by the reference interference light reception means 222.

The measurement interference light counting means 219 receives the output of the measurement interference light reception means 218 and counts the number of interference pulses of the measurement light received by the measurement interference light reception means 218 in response to operation of the driver 215 while the reference interference light counting means 223 receives the output of the reference interference light reception means 222 and counts the number of interference pulses of the reference light received by the reference interference light reception means 222 in response to operation of the driver 215.

The calculation means 221 receives the outputs of the measurement interference light counting means 219 and the the reference interference light counting means 223 and processes the measurement light information and the reference light information by comparison calculation processing to calculate a wavelength or a frequency of the measurement light.

In the fifth and sixth aspects of the present invention described above with reference to FIGS. 5 and 6, second fixed polarization fibers 204 and 214 having a similar characteristic and a similar length to those of the fixed polarization fibers 203 and 213 may be connected to the fixed polarization fibers 203 and 213 such that the axes thereof extend perpendicularly to each other, respectively. In this instance, second drivers 225 and 226 for varying the delay amounts between two perpendicularly polarized light components in the second fixed polarization fibers 204 and 214 and second driver control means 227 and 228 for controlling the driving conditions of the second drivers 225 and 226, respectively, may be provided additionally. Consequently, the delay amount between the two biaxial light components in each of the second fixed polarization fibers 204 and 214 is varied by the second driver 225 OF 226. The driving conditions of the second drivers 225 and 226 are controlled by the second driver control means 227 and 228, respectively.

Optical fiber temperature stabilization means for keeping the temperature of each of the fixed polarization fibers 203 and 213 may additionally be provided. Thus, the temperatures of the fixed polarization optical fibers 203 and 213 are kept at a desired temperature by the optical fiber temperature stabilization means.

Or optical fiber temperature stabilization means for keeping the temperature of each of the fixed polarization fibers 203 and 213 and the second fixed polarization fibers 204 and 214 may additionally be provided. Thus, the temperatures of the fixed polarization optical fibers 203 and 213 and the second fixed polarization fibers 204 and 214 are kept at a desired temperature by the optical fiber temperature stabilization means.

Each of the driver control means 206 and 216 may control the driver 205 or 215 so that signals of a signal train originating from interference light may have an equal or substantially equal time interval from each other.

Or, the driver control means 206 and 216 and the second driver control means 227 and 227 may control the drivers 205 and 215 and the second drivers 225 and 226, respectively, so that signals of a signal train originating from interference light may have an equal or substantially equal time interval from each other.

It is to be noted that, in each of the optical wavelength/frequency detection apparatus of FIGS. 5 and 6, the opposing fixed polarization optical fibers are connected to each other by fusion connection at a point b such that their axes are inclined by 90 degrees relative to each other, and each of the fixed polarization fibers has a fusion connection point a or c at which two segments thereof are connected to each other by fusion connection such that their axes are inclined by 45 degrees relative to each other.

Accordingly, the optical wavelength/frequency detection apparatus of the present invention can achieve the following effects or advantages.

1. Since the optical path length difference can be varied making use of any of various optical effects without using a part of the bulk type, a movable part can be eliminated, and consequently, the optical wavelength/frequency detection apparatus of any of the first to sixth aspects of the present invention can detect a wavelength or a frequency of measurement light with a high degree of reliability and accuracy and with a high resolution for a long period of time while it is small in size.

2. Where a polarization holding coupler and a fixed polarization fiber are employed, polarization of light can be maintained, and consequently, a variation in intensity of interference light caused by a fluctuation in polarization between two paths is eliminated and stabilized wavelength detection can be achieved.

3. Where optical fiber temperature stabilization means is provided for keeping the temperature of each optical fiber at a desired temperature, such a situation can be reduced considerably that the optical path length difference of the fiber is varied by a variation of the temperature of the external environment other than optical path length difference sweeping by the driver.

4. Where averaging processing is applied to both of a wavelength or a frequency of measurement light calculated from the number of interference pulses of the measurement light during sweeping of the optical path length difference between optical fibers by a driver in the going path and a wavelength or a frequency of the measurement light calculated from the number of interference pulses of the measurement light during sweeping of the optical path length difference between the optical fibers by the driver in the returning path to calculate a wavelength or a frequency of the measurement light, the accuracy in measurement can be enhanced, and consequently, the error in measurement caused by a drift can be decreased.

5. Where signals of a signal train originating from interference light may have an equal or substantially equal time interval from each other, the accuracy in counting is enhanced.

b. First Embodiment

Figure 7:
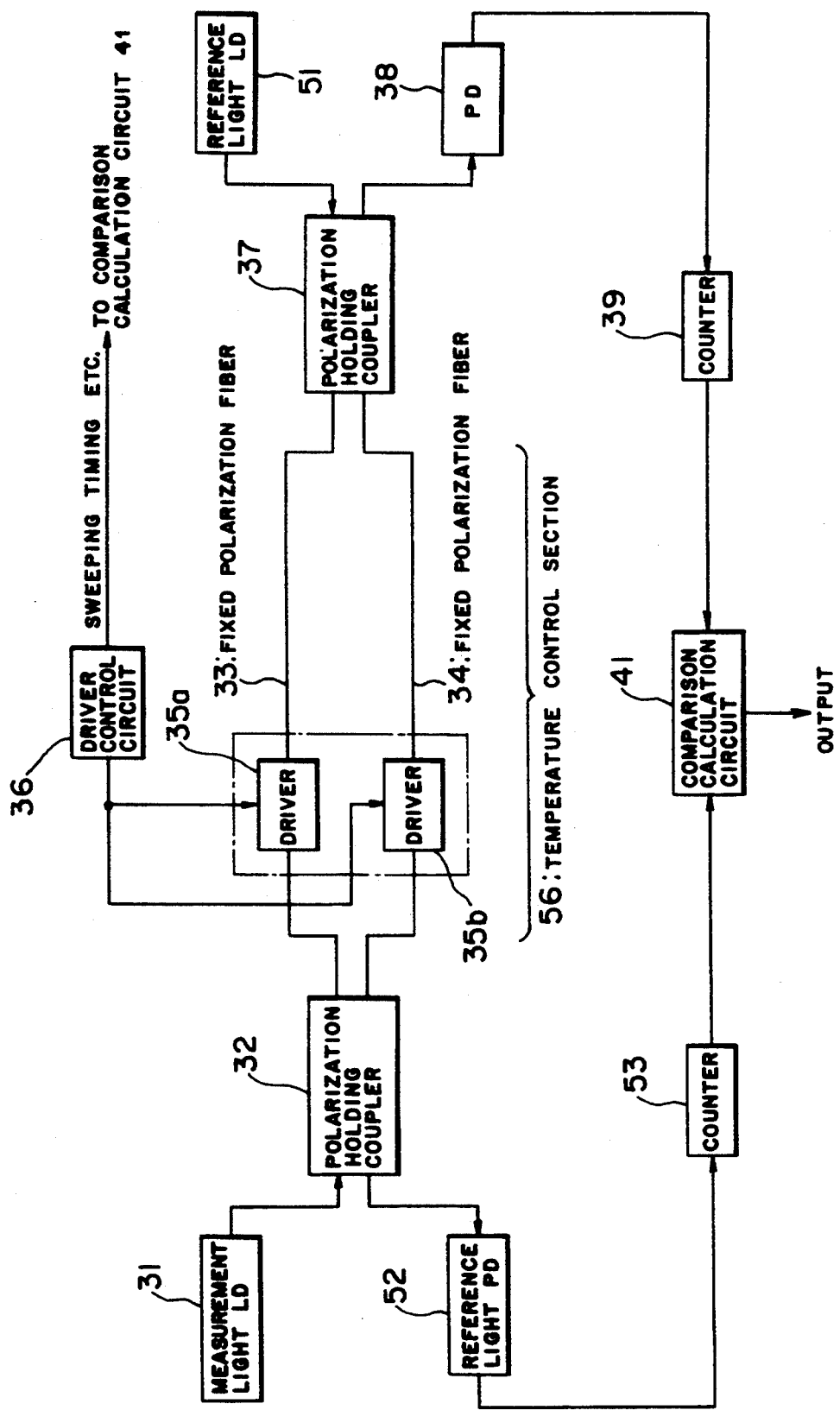
FIG. 7 is a block diagram of an optical wavelength/frequency detection apparatus showing a first preferred embodiment of the present invention.

Referring now to FIG. 7, there is shown in block diagram an optical wavelength/frequency detection apparatus according to a first preferred embodiment of the present invention. The optical wavelength/frequency detection apparatus shown includes a laser diode 31 serving as measurement light generation means for emitting measurement light, and another laser diode 51 serving as reference light generation means for emitting reference light.

A polarization holding coupler 32 splits measurement light from the laser diode 31 and combines reference light. Meanwhile, another polarization holding coupler 37 splits reference light from the laser diode 51 and combines measurement light.

A pair of fixed polarization fibers (optical fibers) 33 and 34 are interposed between the polarization holding couplers 32 and 37 and propagate two outputs of each of the polarization holding couplers 32 and 37 therein.

A temperature control section 56 serving as optical fiber temperature stabilization means is provided for the fixed polarization fibers 33 and 34. The temperature control section 56 keeps the temperatures of the fixed polarization fibers 33 and 34 at a desired temperature.

Figure 9:
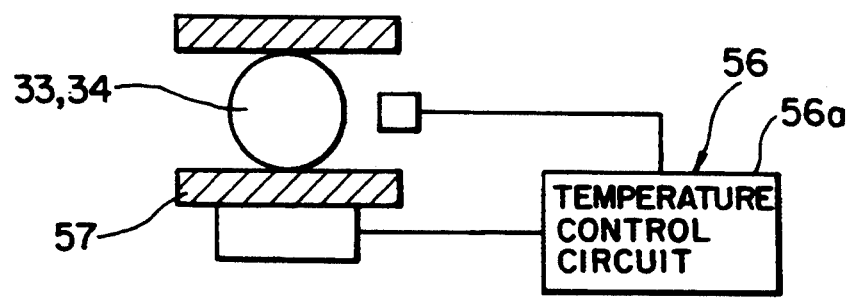
FIG. 9 is a schematic diagrammatic view showing a temperature control section of the optical wavelength/frequency detection apparatus of FIG. 7.

FIG. 9 shows an example of the temperature control section. Referring to FIG. 9, a Peltiet element 57 is controlled by the temperature control circuit 56a to keep the temperature of the fixed polarization fiber 33 or 34 at a desired temperature.

Referring back to FIG. 7, a pair of drivers 35a and 35b vary the relative difference between optical path lengths of two beams of light propagated in the fixed polarization fibers 33 and 34.

Figure 8:
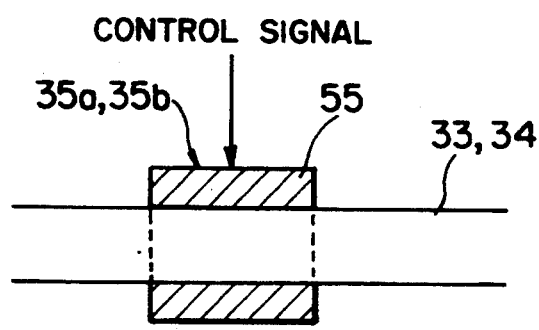
FIG. 8 is a block diagram showing a driver of the optical wavelength/frequency detection apparatus of FIG. 7.

FIG. 8 shows an example of such driver. Referring to FIG. 8, each of the drivers 35a and 35b includes a cylindrical PZT (piezoelectric element) 55 which applies a pressure to the fixed polarization fiber 33 or 34 to vary the relative difference between optical path lengths of two beams of light propagated in the fixed polarization fibers 33 and 34.

Figure 13:
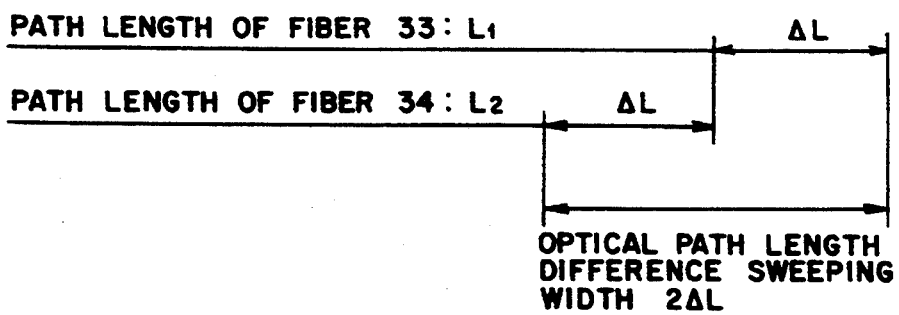
FIG. 13 is a diagrammatic view illustrating an optical path length difference sweeping width.

Referring back again to FIG. 7, a driver control circuit 36 controls the driving conditions of the drivers 35a and 35b. Though not particularly shown in FIG. 7, the driver control circuit 36 includes means, for example, for causing the drivers 35a and 35b to perform a push-pull operation. The driver control circuit 36 further controls the drivers 35a and 35b so that signals of a signal train originating from interference light may have an equal or a substantially equal interval from each other. It is to be noted that, where the driver control circuit 36 includes the means for causing the drivers 35a and 35b to perform a push-pull operation as described above, as seen from FIG. 13, the difference between the lengths L1 and L2 of the optical fibers 33 and 34, that is, L1–L2, is set greater than an optical path length variation width $\Delta L$ by the optical fibers 33 and 34. By this means, the optical path length difference sweeping width can be increased to two times or more, allowing measurement with a high resolution.

Measurement interference light reception means 38 receives interference light of measurement light from the polarization holding coupler 37. For example, a photodiode is used for the measurement interference light reception means 38.

Reference interference light reception means 52 receives interference light of reference light from the polarization holding coupler 32. Also the reference interference light reception means 52 may be constituted from a photodiode.

A measurement interference light counter 39 receives the output of the measurement interference light reception means 38 and counts the number of interference pulses of measurement light received by the measurement interference light reception means 38 in response to operation of the drivers 35a and 35b. For example, a pulse counter is used for the counter 39.

A reference interference light counter 53 receives the output of the reference interference light reception means 52 and counts the number of interference pulses of reference light received by the reference interference light reception means 52 in response to operation of the drivers 35a and 35b. Also the reference interference light counter 53 may be constituted from a pulse counter.

It is to be noted that each of the counters 39 and 53 may be constructed such that it counts the number of interference pulses of light only during optical path length difference sweeping between the fixed polarization fibers 33 and 34 by the drivers 35a and 35b in one direction or alternatively such that it counts the number of interference pulses of light during optical path length difference sweeping between the fixed polarization fibers 33 and 34 in both of the going and returning paths by the drivers 35a and 35b.

A comparison calculation circuit 41 receives the outputs of the measurement interference light counter 39 and the reference interference light counter 53 and processes the measurement light information and the reference light information to calculate a wavelength or a frequency of the measurement light.

Here, the principle of measurement of a wavelength (or a frequency) of measurement light calculated using the counters 39 and 53 and the comparison calculation circuit 41 will be described.

For example, where the optical path length difference between two paths is represented by ΔL and the number of interference pulses outputted from the measurement interference light counter 39 during sweeping from 0 to ΔL is represented by M, the wavelength λ of the measurement light is given by $$\lambda = \Delta L/M \quad (1)$$

Meanwhile, where the number of interference pulses outputted from the reference interference light counter 53 during sweeping from 0 to ΔL is represented by Mref, the wavelength λref of reference light is given by $$\lambda ref = \Delta L/Mref \quad (2)$$

Accordingly, the wavelength λ of the measurement light can be obtained by calculation of $$\lambda = \lambda ref \cdot Mref/M \quad (3)$$

obtained from the equations (1) and (2) above. Thus, an absolute wavelength can be calculated with a high degree of accuracy.

It is to be noted that, where each of the counters 39 and 53 is constructed so as to count the number of interference pulses during optical path length difference sweeping between the fixed polarization fibers 33 and 34 by the drivers 35a and 35b in both of the going and returning paths, the comparison calculation circuit 41 applies averaging processing to a wavelength or a frequency of measurement light calculated based on the number of interference pulses of light during optical path length difference sweeping between the fixed polarization fibers 33 and 34 by the drivers 35a and 35b in the going path and another wavelength or another frequency of the measurement light calculated based on the number of interference pulses of light during optical path length difference sweeping between the fixed polarization fibers 33 and 34 by the drivers 35a and 35b in the returning path to calculate a wavelength or a frequency of the measurement light.

In the optical wavelength/frequency detection apparatus of the construction described above, the polarization holding coupler 32 splits measurement light from the laser diode 31 and combines reference light. Meanwhile, the polarization holding coupler 37 splits reference light from the laser diode 51 and combines measurement light. In this instance, each of the polarization holding couplers 32 and 37 maintains, between the entrance and the exit thereof, polarization of light to eliminate a variation of the intensity of interference light caused by a fluctuation of polarized light between the two paths to allow stabilized detection of a wavelength.

Further, the fixed polarization fibers 33 and 34 in pair interposed between the polarization holding couplers 32 and 37 propagate the two optical outputs of each of the polarization holding couplers 32 and 37 therein. Also the fixed polarization fibers 33 and 34 maintain polarization of light similarly to the polarization holding couplers 32 and 37.

The drivers 35a and 35b vary the relative difference between the optical path lengths of two beams of light propagated in the fixed polarization fibers 33 and 34. As seen from FIG. 8, the cylindrical piezoelectric element 55 provided in each of the drivers 35a and 35b applies a pressure to the fixed polarization fiber 33 or 34 to vary the refractive index of the fixed polarization fiber 33 or 34 to cause a relative difference between the optical path lengths of two beams of light propagated in the fixed polarization fibers 33 and 34.

It is to be noted that, in order to vary the optical path length difference in this manner, in addition to the method described above wherein a piezoelectric element is employed for a driver to apply a pressure in order to make use of a photoelastic effect as described above, a thermo-optical effect, an electro-optical effect or a magneto-optical effect may be employed alternatively. In order to make use of a thermo-optical effect, a Peltier element may be employed for a driver to vary the temperature. In order to make use of an electro-optical effect, an electric field may be applied, and in order to make use of a magneto-optical effect, a magnetic field may be applied.

The temperatures of the fixed polarization fibers 33 and 34 are kept at a desired temperature by the temperature control section 56. In particular, as seen from FIG. 9, the Peltier element 57 maintains the temperature of the fixed polarization fiber 33 or 34 at a desired temperature under the control of the 56a. In this manner, the variation of the optical path length difference between the fixed polarization fibers 33 and 34 caused by a temperature variation of the external environment other than the optical path length difference sweeping by the drivers 35a and 35b can be reduced considerably.

Figures 12A, 12B:
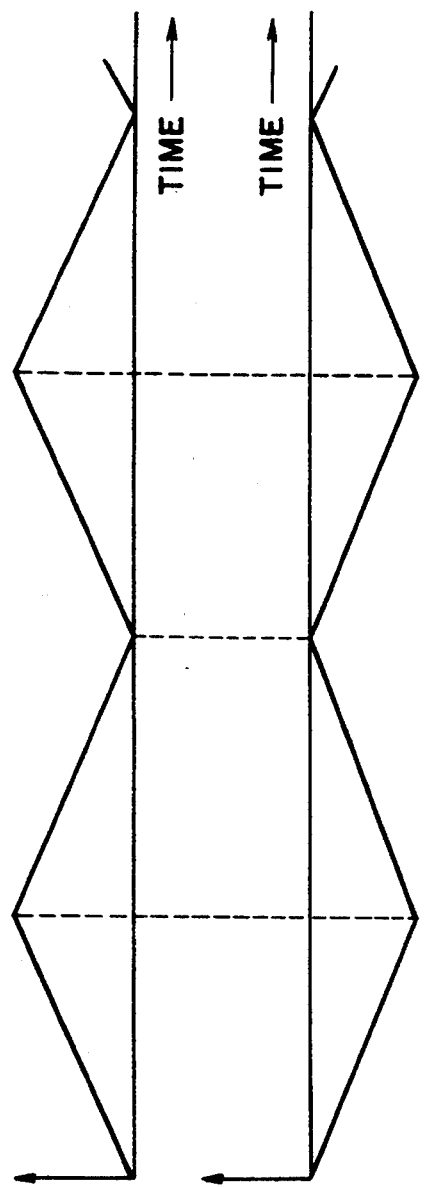
FIGS. 12(a) and 12(b) are waveform diagrams illustrating a push-pull operation.

While the driving conditions of the drivers 35a and 35b are controlled by the driver control circuit 36, for the example, the driver control circuit 36 is used to cause the drivers 35a and 35b to perform a push-pull operation as seen from FIGS. 12(a) and 12(b). In particular, the driver control circuit 36 controls the driving condition of the driver 35a so that it may operate in accordance with the waveform shown in FIG. 12(a) while it controls the other driver 35b so that it may operate in accordance with the waveform shown in FIG. 12(b). This allows reduction of the amplitude of the sweeping signal and increase of the speed of the driving operations of the drivers 35a and 35b. In this instance, the difference between the lengths of the fixed polarization fibers 33 and 34 is set greater than the optical path length variation width by the fixed polarization fibers 33 and 34. Consequently, the optical path length difference sweeping width can be increased to two times or more, allowing measurement with a high resolution.

Meanwhile, when interference pulses of light are detected by means of a frequency counter, the interval between pulses must be equal, and also when the number of pulses is measured by means of a counter, preferably the interval between the pulses is equal. In order to output pulses at an equal interval, the optical path length difference must necessarily be swept linearly. However, even when the control signal for sweeping is linear, the optical path length difference does not sometimes respond linearly. For example, when heat is generated by a heater employing chrome or a like material to make use of a thermo-optical effect, while, where the current of the sweeping signal is represented by I and the amount of heat generated in proportion to the optical path length difference is represented by Q, the amount of heat generation is given by $Q=I^2 \cdot R$ (R is a resistance of the heater), since, in this instance, the amount Q of heat generation does not increase in proportion to the sweeping signal I, the optical path length difference does not present a linear variation. Accordingly, the driver control circuit 36 outputs, as a sweeping signal. $I^2$ which increases in proportion to the optical path length difference. Consequently, signals of a signal train originating from interference light have an equal or a substantially equal interval from each other, which contributes to enhancement of the counting accuracy.

Interference light of the measurement light from the polarization holding coupler 37 is received by the photodiode of the measurement interference light reception means 38. The measurement interference light counter 39 thus receives the output of the measurement interference light reception means 38 and counts the number of interference pulses of the measurement light received by the measurement interference light reception means 38 in response to operation of the drivers 35a and 35b.

Meanwhile, interference light of the reference light from the polarization holding coupler 32 is received by the photodiode of the reference interference light reception means 52. The reference interference light counter 53 thus receives the output of the reference interference light reception means 52 and counts the number of interference pulses of the reference light received by the reference interference light reception means 52 in response to operation of the drivers 35a and 35b.

Figure 10:
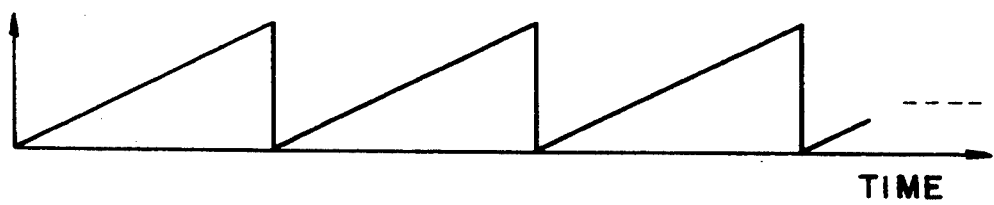
FIG. 10 is a diagram illustrating optical path length difference sweeping.

In this instance, if each of the counters 39 and 53 counts the number of interference pulses of light during optical path length difference sweeping of the fixed polarization fibers 33 and 34 by the drivers 35a and 35b in one direction as seen from FIG. 10 or if optical path length difference sweeping of the fixed polarization fibers 33 and 34 is performed by the drivers 35a and 35b, respectively, as seen from FIGS. 11(a) and 11(b), then it sometimes occurs that the density of interference pulses is increased in the going path (or returning path) but is decreased in the returning path (or going path) by a variation of the ambient temperature or some disturbance. In order to prevent this, the number of interference pulses of light may be counted during optical path length difference sweeping between the fixed polarization fibers 33 and 34 by the drivers 35a and 35b in both of the going path and the returning path.

The comparison calculation circuit 41 receives the outputs of the counters 39 and 53 and processes the measurement light information and the reference light information by comparison calculation processing to calculate a wavelength or a frequency of the measurement light.

By the way, where each of the counters 39 and 53 counts the number of interference pulses of light during optical path length difference sweeping between the fixed polarization fibers 33 and 34 by the driver control circuit 36 in both of the going path and the returning path, the comparison calculation circuit 41 applies averaging processing to a wavelength or a frequency of the measurement light calculated based on the number of interference pulses of light during optical path length difference sweeping between the fixed polarization fibers 33 and 34 by the drivers 35a and 35b in the going path and another wavelength or another frequency of the measurement light calculated based on the number of interference pulses during optical path length difference sweeping between the fixed polarization fibers 33 and 34 by the drivers 35a and 35b in the returning path to calculate a wavelength or a frequency of the measurement light. Consequently, the accuracy in measurement can be enhanced, and accordingly, the error in measurement caused by a drift can be reduced.

With the optical wavelength/frequency detection apparatus of the first embodiment of the present invention described above, there is an advantage in that the reliability for a long period of time is high since a movable part is eliminated by varying the optical path length difference making use of any of various optical effects without employing a part of the bulk type. Further, miniaturization of the apparatus is possible. Further, by employing an optical coupler, splitting and combination of light can be performed readily. Consequently, a wavelength or a frequency of measurement light can be detected with a high degree of accuracy and with a high resolution.

Further, by employing a polarization holding coupler and a fixed polarization fiber, polarization of light can be maintained. Consequently, a variation in intensity of interference light caused by a fluctuation in polarization between the two paths can be eliminated and stabilized detection of a wavelength can be achieved.

Furthermore, by providing optical fiber temperature stabilization means, the variation of the optical path length difference of a fiber caused by a variation of the temperature of the external environment other than optical path length difference sweeping by a driver can be reduced considerably.

Further, since averaging processing is applied to a wavelength or a frequency of measurement light calculated based on the number of interference pulses during optical path length difference sweeping between the optical fibers by drivers in the going path and another wavelength or another frequency of the measurement light calculated based on the number of interference pulses during optical path length difference sweeping between the optical fibers by the drivers in the returning path to calculate a wavelength or a frequency of the measurement light, the accuracy in measurement can be enhanced, and consequently, the error in measurement caused by a drift can be reduced.

In addition, it can contribute to enhancement of the counting accuracy to cause signals of a signal train, which originates from interference light, to have an equal or a substantially equal interval from each other.

c. Second Embodiment

While the optical wavelength/frequency detection apparatus of the first embodiment involves generation of reference light by means of the laser diode 51 as described above, it may be modified so as to eliminate the system for reference light as seen in FIG. 14. Referring to FIG. 14, the modified optical wavelength/frequency detection apparatus does not include any system for reference light but includes reference light information setting means 59 for setting reference light information instead so that reference light information from the reference light information setting means 59 may be used as reference information for a comparison calculation circuit 41A. In this instance, the comparison calculation circuit 41A receives the outputs of the counter 39 and the reference light information setting means 59 and processes the measurement light information and the reference light information by comparison calculation processing to calculate a wavelength or a frequency of the measurement light. It is to be noted that like reference characters in FIG. 14 denote like reference elements to those of FIG. 7.

Also in the optical wavelength/frequency detection apparatus of the present embodiment, each of the polarization holding couplers 32 and 37 is constructed as a polarization holding coupler while each of the fixed polarization fibers 33 and 34 is constructed as a fixed polarization fiber, and the optical fiber temperature stabilization circuit 56 for keeping the temperatures of the optical fibers 33 and 34 at a desired temperature is provided.

Further, the counter 39 is constructed so that it counts the number of interference pulses of light during optical path length difference sweeping between the fixed polarization fibers 33 and 34 by the drivers 35a and 35b in both of the going path and the returning path, and the comparison calculation circuit 41A is constructed so as to apply averaging processing to a wavelength or a frequency of measurement light calculated based on the number of interference pulses of light during optical path length difference sweeping between the fixed polarization fibers 33 and 34 by the drivers 35a and 35b in the going path and another wavelength or another frequency of the measurement light calculated based on the number of interference pulses during optical path length difference sweeping between the fixed polarization fibers 33 and 34 by the drivers 35a and 35b in the returning path to calculate a wavelength or a frequency of the measurement light.

Further, the difference between the lengths of the fixed polarization fibers 33 and 34 is set greater than an optical path length variation width by the fixed polarization fibers 33 and 34, and the driver control circuit 36 includes means for causing the drivers 35a and 35b to perform a push-pull operation.

Further, the driver control circuit 36 controls the drivers 35a and 35b so that signals of a signal train originating from interference light may have an equal or a substantially equal interval from each other.

d. Third Embodiment

Referring now to FIG. 15, there is shown an optical wavelength/frequency detection apparatus according to a third preferred embodiment of the present invention. The optical wavelength/frequency detection apparatus includes a laser diode 31 serving as measurement light generation means for generating measurement light, and another laser diode 51 serving as reference light generation means for generating reference light.

A polarized light composer 148 composes measurement light from the laser diode 31 and reference light from the laser diode 51 so that they may be mutually perpendicularly polarized light.

A pair of polarization holding optical fibers 133 and 134 receive, at first ends thereof adjacent the polarized light composer 148, the optical output of the polarized light composer 148 and propagates the light therethrough while maintaining the polarization of it.

A temperature control section 56 serving as optical fiber temperature stabilization means is provided for the polarization holding optical fibers 133 and 134. The temperature control section 56 keeps the temperatures of the polarization holding optical fibers 133 and 134 at a desired temperature and may be constructed in a similar manner as the temperature control section 56 of the first embodiment described hereinabove with reference to FIG. 9.

A pair of drivers 35a and 35b vary the relative difference between optical path lengths of two beams of light propagated in the polarization holding optical fibers 133 and 134. Each of the drivers 35a and 35b may be constituted, for example, from a cylindrical piezoelectric element (refer to FIG. 8). The cylindrical piezoelectric element applies a pressure to each of the polarization holding optical fibers 133 and 134 to vary the relative difference between optical path lengths of two beams of light propagated in the polarization holding optical fibers 133 and 134.

A driver control circuit 36 controls the driving condition of the drivers 35a and 35b and includes means for causing, for example, the drivers 35a and 35b to perform a push-pull operation. Further, the driver control circuit 36 controls the drivers 35a and 35b so that signals of a signal train originating from interference light may have an equal or a substantially equal interval from each other. It is to be noted that, where the driver control circuit 36 includes the means for causing the drivers 35a and 35b to individually perform a push-pull operation as described above, the difference between the lengths of the polarization holding optical fibers 133 and 134, that is, $L1-L2$, is set greater than the optical path length variation width $\Delta L$ by the polarization holding optical fibers 133 and 134 (Refer to FIG. 13). By this means, the optical path length difference sweeping width can be increased to twice or more, and measurement with a high resolution is allowed.

Figure 16A:
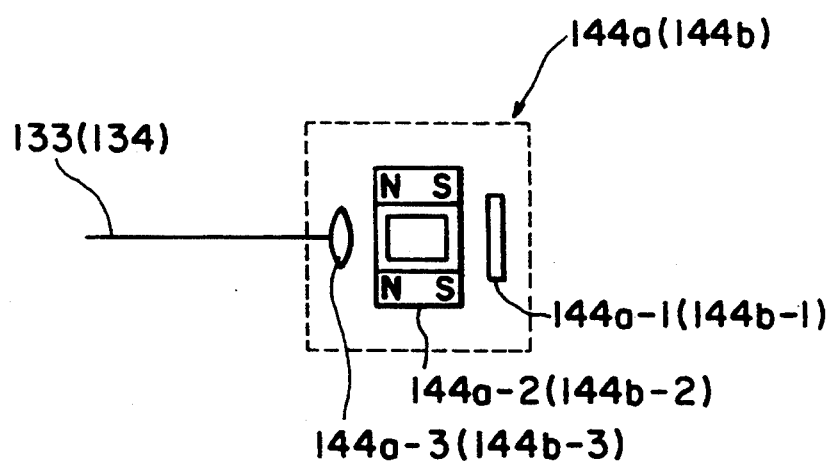
FIG. 16(a) is a diagrammatic view showing a construction of reflection means with an optical non-reciprocal element.
Figure 16B:
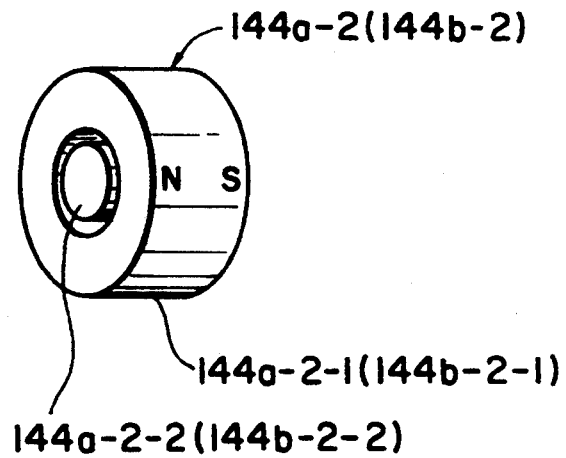
FIG. 16(b) is a perspective view showing a construction of the optical non-reciprocal element.

Each of a pair of reflection means 144a and 144b has, as particularly seen in FIG. 16(a), a reflection element 144a-1 or 144b-1 provided adjacent an end of the optical fiber 133 or 134 remote from the driver 35a or 35b, and an optical non-reciprocal element 144a-2 or 144b-2 interposed between the reflection element 144a-1 or 144b-1 and the end of the optical fiber 133 OF 134. Here, each of the optical non-reciprocal elements 144a-2 and 144b-2 includes, as shown in FIG. 16(b), a cylindrical magnet 144a-2-1 or 144b-2-1 and a optical non-reciprocal rotator 144a-2-2 or 144b-2-2 located in the cylindrical magnet 144a-2-1 or 144b-2-1. It is to be noted that reference characters 144a-3 and 144b-3 in FIG. 16(a) denote each a collimate lens.

Accordingly, each of the reflection means 144a and 144b rotates, when polarized light passes therethrough, the polarization direction of the polarized light by $45°+90° \times m$ ($m=0, 1, 2, ...$) and reflects light, which has propagated in the optical fiber 133 or 134, at the adjacent end of the optical fiber 133 or 134 to introduce the light back into the corresponding optical fiber 133 or 134.

Figure 17A:
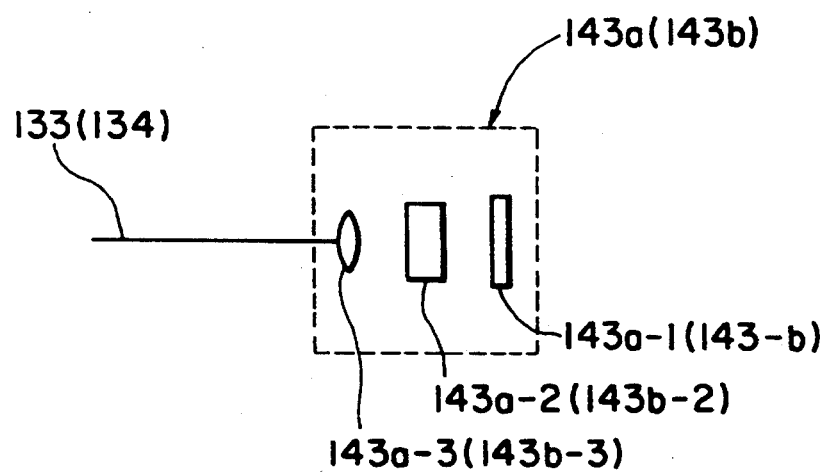
FIG. 17(a) is a diagrammatic view showing a construction of reflection means with a quarter wavelength member.

Alternatively, a pair of reflection means 143a and 143b with an optical non-reciprocal element may be provided adjacent the ends of polarization holding optical fibers 133 and 134 remote from the drivers 35a and 35b, respectively, as shown in FIG. 17(a). In particular, referring to FIG. 17(a), each of the reflection means 143a and 143b includes a reflection element 143a-1 or 143b-1 located adjacent the end of the optical fiber 133 or 134 remote from the driver 35a or 35b, and a quarter wavelength member 143a-2 or 143b-2 interposed between the reflection element 143a-1 or 143b-1 and the end of the optical fiber 133 or 134 and having an optical axis inclined by 45° with respect to the stress applying direction of the optical fiber 133 or 134. It is to be noted that reference characters 143a-3 and 143b-3 in FIG. 17(a) denote each a collimate lens.

Figure 17B:
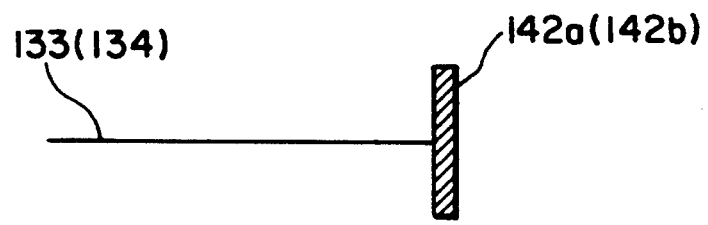
FIG. 17(b) is a diagrammatic view illustrating use of a reflection mirror as the reflection means.

Or alternatively, each of the reflection means may be constructed as a reflection mirror 142a or 142b located adjacent the end of the optical fiber 133 or 134 and having a predetermined reflection factor as shown in FIG. 17(b).

Referring back to FIG. 15, a polarization holding coupler 32 is interposed between the polarized light composer 148 and the polarization holding optical fibers 133 and 134 and splits the optical output of measurement light and reference light from the polarized light composer 148 into two beams of light, which are inputted into first ends of the polarization holding optical fibers 133 and 134. Further, the polarization holding coupler 32 combines reflected light beams outputted from the first ends of the polarization holding optical fibers 133 and 134.

A polarized light decomposer 149 decomposes light, which has been combined by the polarization holding coupler 32, into two beams of light polarized perpendicularly to each other.

A Michelson interferometer is thus constituted from the polarization holding coupler 32, drivers 35a and 35b, driver control circuit 36, reflection means 144a and 144b (reflection means 143a and 143b with a quarter wavelength member or reflection means 142a and 142b) and polarized light decomposer 149.

Measurement interference light reception means 38 receives interference light of measurement light from between two polarized light beams decomposed by the polarized light decomposer 149. For example, a photodiode is used for the measurement interference light reception means 38.

Reference interference light reception means 52 receives interference light of reference light from between two polarized light beams decomposed by the polarized light decomposer 149. Also for the reference interference light reception means 52, for example, a photodiode is used.

A measurement interference light counter 39 receives the output of the measurement interference light reception means 38 and counts the number of interference pulses of measurement light received by the measurement interference light reception means 38 in response to operation of the drivers 35a and 35b. For example, a pulse counter is used for the counter 39.

A reference interference light counter 53 receives the output of the reference interference light reception means 52 and counts the number of interference pulses of reference light received by the reference interference light reception means 52 in response to operation of the drivers 35a and 35b. Also for the reference interference light counter 53, for example, a pulse counter is used.

It is to be noted that each of the counters 39 and 53 may be constructed such that it counts the number of interference pulses of light only during optical path length difference sweeping between the polarization holding optical fibers 133 and 134 by the drivers 35a and 35b in one direction or alternatively such that it counts the number of interference pulses of light during optical path length difference sweeping between the polarization holding optical fibers 133 and 134 in both of the going and returning paths by the drivers 35a and 35b.

A comparison calculation circuit 41 receives the outputs of the measurement interference light counter 39 and the reference interference light counter 53 and processes the measurement light information and the reference light information by comparison calculation processing to calculate a wavelength or a frequency of the measurement light.

Here, the principle of measurement of a wavelength (or a frequency) of measurement light calculated using the counters 39 and 53 and the comparison calculation circuit 41 is similar to that described hereinabove in connection with the first embodiment, and accordingly, overlapping description thereof is omitted herein to avoid redundancy.

It is to be noted that, where each of the counters 39 and 53 is constructed so as to count the number of interference pulses during optical path length difference sweeping between the fixed polarization fibers 33 and 34 by the drivers 35a and 35b in both of the going and returning paths, the comparison calculation circuit 41 applies averaging processing to a wavelength OF a frequency of measurement light calculated based on the number of interference pulses of light during optical path length difference sweeping between the polarization holding optical fibers 133 and 134 by the drivers 35a and 35b in the going path and another wavelength or another frequency of the measurement light calculated based on the number of interference pulses of light during optical path length difference sweeping between the polarization holding optical fibers 133 and 134 by the drivers 35a and 35b in the returning path to calculate a wavelength or a frequency of the measurement light.

In the optical wavelength/frequency detection apparatus of the construction described above, measurement light from the laser diode 31 and reference light from the laser diode 51 are composed by the polarized light composer 148 so that they may be polarized perpendicularly to each other.

The optical output of the polarized light composer 148 is split into two light beams by the polarization holding coupler 32 interposed between the polarized light composer 148 and the polarization holding optical fibers 133 and 134, and the two light beams are inputted into the first ends of the polarization holding optical fibers 133 and 134 adjacent the polarization holding coupler 32. In this instance, the polarization holding coupler 32 maintains the polarization of the light between the entrance and the exit thereof to eliminate a variation in intensity of interference light caused by a fluctuation of the polarized light between the two paths to allow stabilized detection of a wavelength.

The optical outputs of the polarization holding coupler 32 are received at the first ends of the polarization holding optical fibers 133 and 134 and propagated in the polarization holding optical fibers 133 and 134 while the polarizations thereof are maintained.

The drivers 35a and 35b vary the relative difference between the optical path lengths of the two beams of light propagated in the polarization holding optical fibers 133 and 134.

Each of the drivers 35a and 35b may be constituted, for example, from a cylindrical PZT (piezoelectric element). The cylindrical piezoelectric element applies a pressure to the polarization holding optical fiber 133 or 134 to vary the refraction index to vary the relative difference between optical path lengths of two light beams propagated in the polarization holding optical fibers 133 and 134. It is to be noted that, in order to Vary the optical path length difference in this manner, in addition to the method described above wherein a piezoelectric element is employed for a driver to apply a pressure in order to make use of a photoelastic effect as described above, a thermo-optical effect, an electro-optical effect or a magneto-optical effect may be employed alternatively. In order to make use of a thermo-optical effect, a Peltier element may be employed for a driver to vary the temperature. In order to make use of an electro-optical effect, an electric field may be applied, and in order to make use of a magneto-optical effect, a magnetic field may be applied.

By the way, while the driving conditions of the drivers 35a and 35b are controlled by the driver control circuit 36, for the example, the driver control circuit 36 is used to cause the drivers 35a and 35b to perform a push-pull operation as described hereinabove with reference to FIGS. 12(a) and 12(b). In particular, the driver control circuit 36 controls the driving condition of the driven 35a so that it may operate in accordance with the waveform shown in FIG. 12(a) while it controls the other driver 35b so that it may operate in accordance with the waveform shown in FIG. 12(b). This allows reduction of the amplitude of the sweeping signal and increase of the speed of the driving operations of the drivers 35a and 35b. Also in this instance, the difference between the lengths of the polarization holding optical fibers 133 and 134, that is, L1−L2, is set greater than the optical path length variation width ΔL by the polarization holding optical fibers 133 and 134. Consequently, the optical path length difference sweeping width can be increased to two times or more, allowing measurement with a high resolution.

Meanwhile, when interference pulses of light are detected by means of a frequency counter, the interval between pulses must be equal, and also when the number of pulses is measured by means of a counter, preferably the interval between the pulses is equal. In order to output pulses at an equal interval, the optical path length difference must necessarily be swept linearly. However, even when the control signal for sweeping is linear, the optical path length difference does not sometimes respond linearly. For example, when heat is generated by a heater employing chrome or a like material to make use of a thermo-optical effect, while, where the current of the sweeping signal is represented by I and the amount of heat generated in proportion to the optical path length difference is represented by Q, the amount of heat generation is given by $Q = I^2 \cdot R$ (R is a resistance of the heater), since, in this instance, the amount Q of heat generation does not increase in proportion to the sweeping signal I, the optical path length difference does not present a linear variation. Accordingly, the driver control circuit 36 outputs, as a sweeping signal, $I^2$ which increases in proportion to the optical path length difference. Consequently, signals of a signal train originating from interference light have an equal or a substantially equal interval from each other, which contributes to enhancement of the counting accuracy.

Meanwhile, the temperatures of the polarization holding optical fibers 133 and 134 are kept at a desired temperature by the temperature control section 56 serving as optical fiber temperature stabilization means. For example, the temperature of each of the polarization holding optical fibers 133 and 134 is kept at a desired temperature by means of a Peltier effect element. Thus, the variation of the optical path length difference between the polarization holding optical fibers 133 and 134 caused by a temperature variation of the external environment other than the optical path length difference sweeping by the drivers 35a and 35b can be reduced considerably.

Where the reflection means 144a and 144b with an optical non-reciprocal element are located at the second ends of the polarization holding optical fibers 133 and 134, light having propagated in the polarization holding optical fibers 133 and 134 is rotated in polarization direction by 45° + 90° × m (m = 1, 2, ...) by the reflection means 144a and 144b when the light passes through the optical non-reciprocal elements 144a-2 and 144b-2 once and then reflected by the reflection elements 144a-1 and 144b-1 so that it is returned into the corresponding polarization holding optical fibers 133 and 134 passing through the optical non-reciprocal elements 144a-2 and 144b-2 for the second time. Consequently, the polarized light is rotated a total of 90° + 180° × m (m = 0, 1, 2, ...).

Where the reflection means 143a and 143b with a quarter wavelength plate having an optical axis inclined by 45° with respect to the stress applying direction of the optical fiber 133 or 134 are located as reflection means adjacent the second ends of the polarization holding optical fibers 133 and 134, light having propagated in the polarization holding optical fibers 133 and 134 is converted into circularly polarized light by the reflection means 143a and 143b and then reflected back into the corresponding polarization holding optical fibers 133 and 134. The polarized light then has a polarization plane rotated by 90°.

Or, where each of the reflection means is constructed as the reflection mirror 142a or 142b located adjacent the second end of the optical fiber 133 or 134 and having a predetermined reflection factor, light having propagated in the polarization holding optical fibers 133 and 134 is reflected at the second ends of the polarization holding optical fibers 133 and 134 by the reflection mirrors 142a and 142b so that it is introduced back into the corresponding polarization holding optical fibers 133 and 134.

The reflected light beams are then outputted from the first ends of the polarization holding optical fibers 133 and 134 and combined by the polarization holding coupler 32.

In this instance, the polarization holding coupler 32 maintains the polarization of the light between the entrance and the exit thereof to eliminate a variation of the intensity of interference light caused by a fluctuation of the polarized light between the two paths to allow stabilized detection of a wavelength.

The light combined by the polarization holding coupler 32 is decomposed into two mutually perpendicularly polarized light beams by the polarized light decomposer 149.

Of the two perpendicularly polarized light beams decomposed by the polarized light decomposer 149, interference light of the measurement light is received by the photodiode of the measurement interference light reception means 38. Then, the measurement interference light counter 39 receives the output of the measurement interference light reception means 38 and counts the number of interference pulses of the measurement light received by the measurement interference light reception means 38 in response to operation of the drivers 35a and 35b.

Interference light of the reference light from between the two perpendicularly polarized light beams decomposed by the polarized light decomposer 149 is received by the photodiode of the reference interference light reception means 52. Then, the reference interference light counter 53 receives the output of the reference interference light reception means 52 and counts the number of interference pulses of the reference light received by the reference interference light reception means 52 in response to operation of the drivers 35a and 35b.

It is to be noted that each of the counters 39 and 53 may count the number of interference pulses of light during optical path length difference sweeping of the polarization holding optical fibers 133 and 134 by the drivers 35a and 35b only in one direction as described hereinabove with reference to FIG. 10, or if optical path length difference sweeping of the polarization holding optical fibers 133 and 134 is performed by the drivers 35a and 35b, respectively, as seen from FIGS. 11(a) and 11(b), then it sometimes occurs that the density of interference pulses is increased in the going path (or returning path) but is decreased in the returning path (or going path) by a variation of the ambient temperature or some disturbance. In order to prevent this, the number of interference pulses of light may be counted during optical path length difference sweeping between the polarization holding optical fibers 133 and 134 by the drivers 35a and 35b in both of the going path and the returning path.

The comparison calculation circuit 41 receives the outputs of the measurement interference light counter 39 and the reference interference light counter 53 and processes the measurement light information and the reference light information by comparison calculation processing to calculate a wavelength OF a frequency of the measurement light.

By the way, where each of the counters 39 and 53 counts the number of interference pulses during optical path length difference sweeping between the polarization holding optical fibers 133 and 134 by the drivers 35a and 35b, for example, in both of the going and returning paths, the comparison calculation circuit 41 applies averaging processing to a wavelength or a frequency of measurement light calculated based on the number of interference pulses of light during optical path length difference sweeping between the polarization holding optical fibers 133 and 134 by the drivers 35a and 35b in the going path and another wavelength or another frequency of the measurement light calculated based on the number of interference pulses of light during optical path length difference sweeping between the polarization holding optical fibers 133 and 134 by the drivers 35a and 35b in the returning path to calculate a wavelength or a frequency of the measurement light, and accordingly, the accuracy in measurement can be enhanced, and consequently, the error in measurement caused by a drift can be reduced.

It is to be noted that, while all of the optical fibers employed in the arrangement of FIG. 15 are polarization holding optical fibers, when the emission optical fiber of the laser diode 31 (measurement light generation means) is not a polarization holding optical fiber, a polarization controller for controlling the polarization of light should be interposed between the laser diode 31 and the polarized light composer 148. Or, the photoelectric power level of the laser diode 51 should be set higher than the photoelectric power level of the laser diode 31 so that the reference interference light counter 53 may not be influenced when it counts interference pulses of light of the laser diode 51 (reference light generation means).

With the optical wavelength/frequency detection apparatus of the third embodiment of the present invention described above, similar effects to those of the first embodiment described above can be achieved. In addition, by providing reflection means at the second ends of the optical fibers, the light path is folded back, and consequently, the optical path length is reduced to one half comparing with that of a Mach-Zehnder interferometer. In particular, since a variable part can be eliminated by varying the optical path length difference making use of any of various optical effects without employing a part of the bulk type, there is an advantage in that the reliability is assured for a long period of time, and besides, miniaturization of the apparatus is possible. Further, by employing an optical coupler, splitting and combining of light can be performed readily. Consequently, a wavelength or a frequency of measurement light can be detected with a high degree of accuracy and with a high resolution.

Further, by employing a polarization holding coupler and a fixed polarization fiber, polarization of light can be maintained. Consequently, a variation in intensity of interference light caused by a fluctuation in polarization between the two paths can be eliminated and stabilized detection of a wavelength can be achieved.

Furthermore, by providing optical fiber temperature stabilization means, the variation of the optical path length difference of a fiber caused by a variation of the temperature of the external environment other than optical path length difference sweeping by a driver can be reduced considerably.

Further, since averaging processing is applied to a wavelength or a frequency of measurement light calculated based on the number of interference pulses during optical path length difference sweeping between the optical fibers by drivers in the going path and another wavelength or another frequency of the measurement light calculated based on the number of interference pulses during optical path length difference sweeping between the optical fibers by the drivers in the returning path to calculate a wavelength or a frequency of the measurement light, the accuracy in measurement can be enhanced, and consequently, the error in measurement caused by a drift can be reduced.

In addition, it can contribute to enhancement of the counting accuracy to cause signals of a signal train, which originates from interference light, to have an equal or a substantially equal interval from each other.

e. Fourth Embodiment

Figure 18:
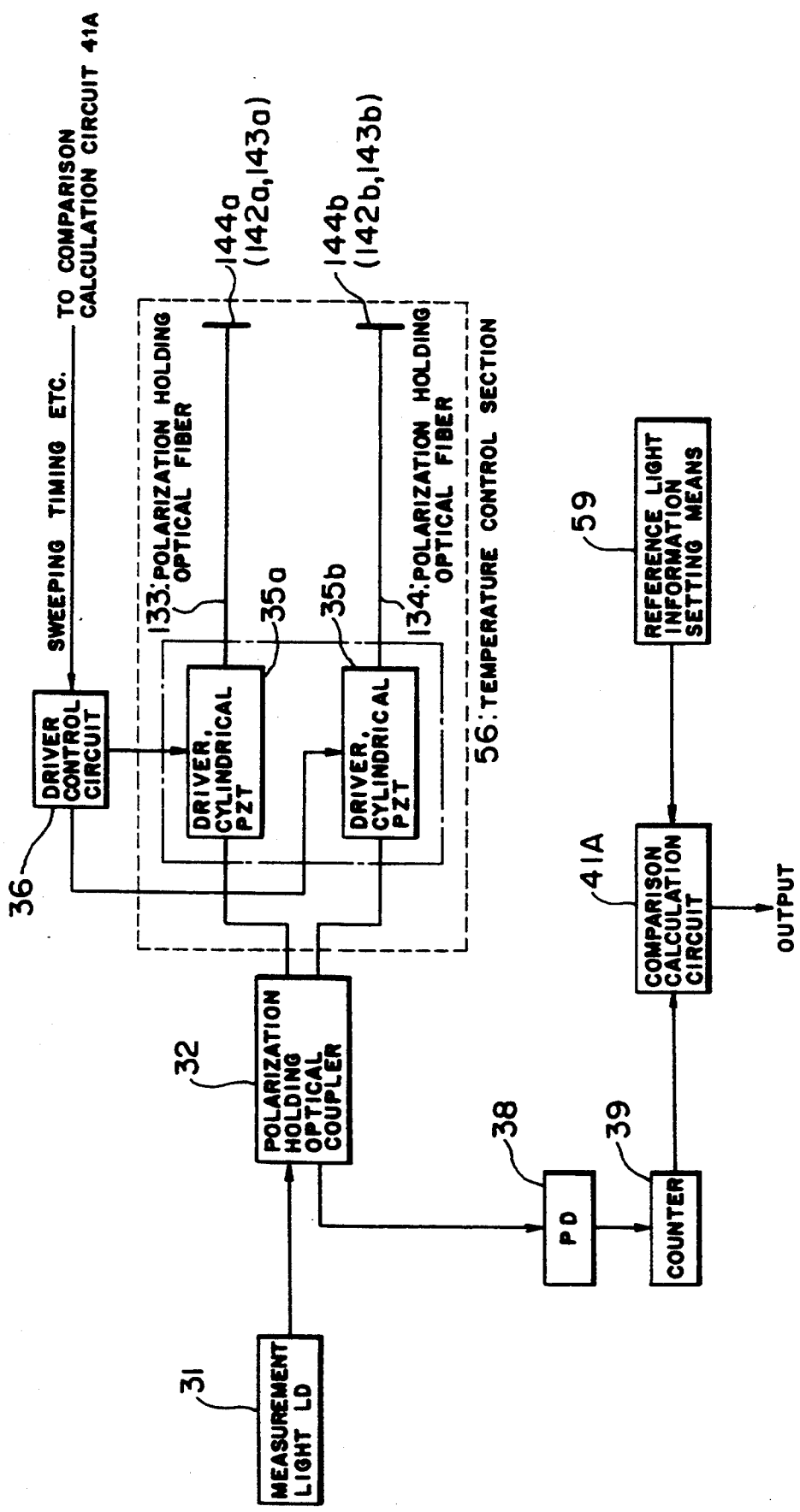
FIG. 18 is a block diagram of a still further optical wavelength/frequency detection apparatus showing a fourth preferred embodiment of the present invention.

While the optical wavelength/frequency detection apparatus of the third embodiment involves generation of reference light by means of the laser diode 51 as described above, it may be modified so as to eliminate the system for reference light as seen in FIG. 18. Referring to FIG. 18, the modified optical wavelength/frequency detection apparatus does not include any system for reference light but includes reference light information setting means 59 for setting reference light information instead so that reference light information from the reference light information setting means 59 may be used as reference information for a comparison calculation circuit 41A. In this instance, the comparison calculation circuit receives the outputs of the counter 39 and the reference light information setting means 59 and processes the measurement light information and the reference light information by comparison calculation processing to calculate a wavelength or a frequency of the measurement light. It is to be noted that like reference characters in FIG. 18 denote like reference elements to those of FIG. 15.

Also in the optical wavelength/frequency detection apparatus of the present embodiment, the polarization holding coupler 32 is constructed as a polarization holding coupler while each of the optical fibers 133 and 134 is constructed as a fixed polarization fiber, and the optical fiber temperature stabilization circuit 56 for keeping the temperatures of the optical fibers 133 and 134 at a desired temperature is provided.

Further, the counter 39 is constructed so that it counts the number of interference pulses of light during optical path length difference sweeping between the optical fibers 133 and 134 by the drivers 35a and 35b either in one direction or in both of the going path and the returning path, and the comparison calculation circuit 41A is constructed so as to apply averaging processing to a wavelength or a frequency of measurement light calculated based on the number of interference pulses of light during optical path length difference sweeping between the optical fibers 133 and 134 by the drivers 35a and 35b in the going path and another wavelength or another frequency of the measurement light calculated based on the number of interference pulses during optical path length difference sweeping between the optical fibers 133 and 134 by the drivers 35a and 35b in the returning path to calculate a wavelength or a frequency of the measurement light.

Further, the difference between the lengths of the optical fibers 133 and 134 is set greater than an optical path length variation width by the optical fibers 133 and 134, and the driver control circuit 36 includes means for causing the drivers 35a and 35b to perform a push-pull operation.

Further, the driver control circuit 36 controls the drivers 35a and 35b so that signals of a signal train originating from interference light may have an equal or a substantially equal interval from each other.

Further, each of the reflection means may additionally include an optical non-reciprocal element located at the second end of the polarization holding optical fiber 133 or 134 for rotating the polarization direction by 45°+90° x m (m=0, 1, 2, ... ) or a quarter wavelength element located at the same location and having an optical axis inclined by 45° with respect to the stress applying direction of the polarization holding optical fibers 133 and 134 or may be constituted from a reflection mirror having a predetermined reflection factor.

f. Fifth embodiment

Figure 19:
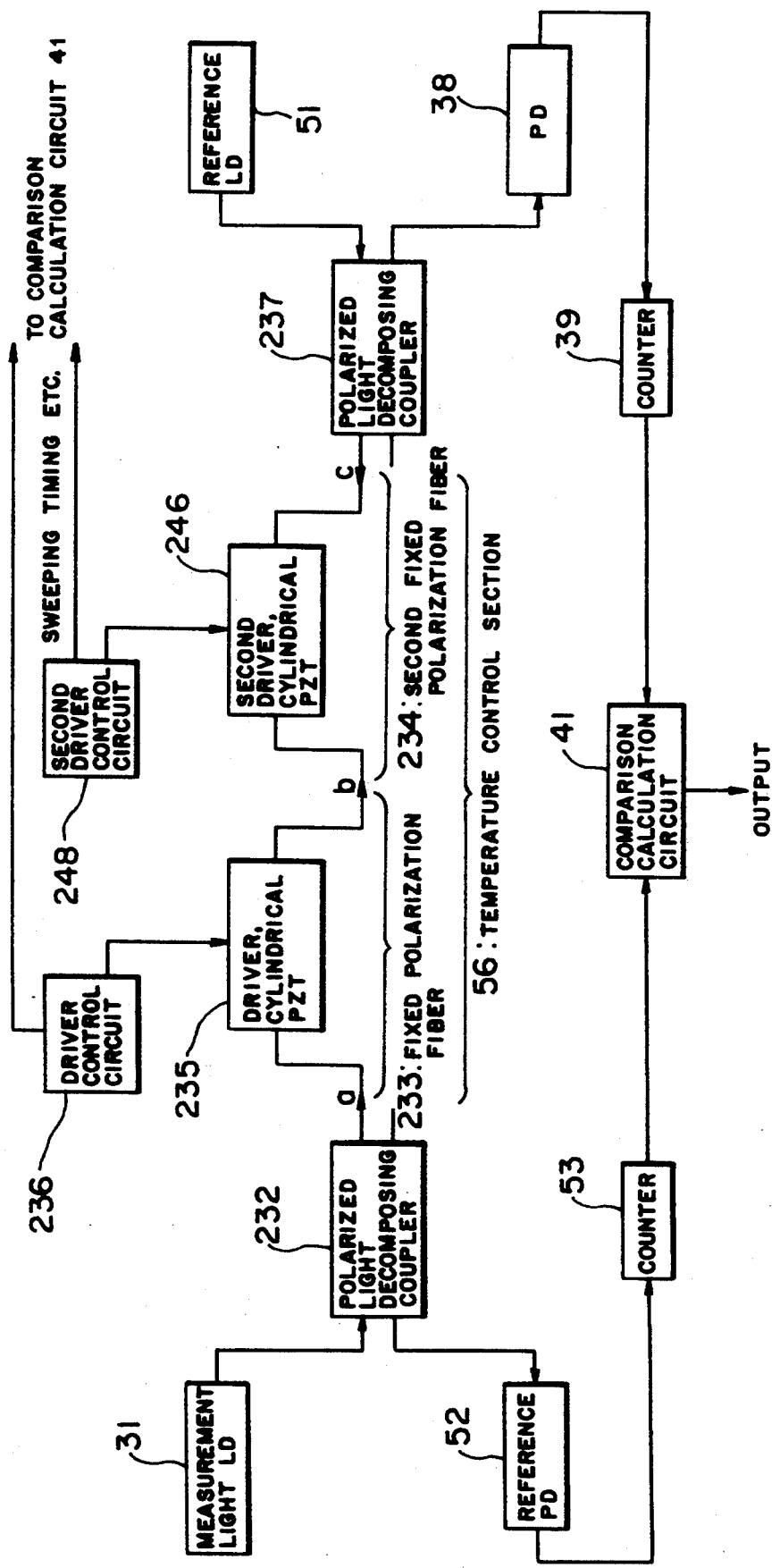
FIG. 19 is a block diagram of a yet further optical wavelength/frequency detection apparatus showing a fifth preferred embodiment of the present invention.

Referring now to FIG. 19, there is shown an optical wavelength/frequency detection apparatus according to a fifth preferred embodiment of the present invention. The optical wavelength/frequency detection apparatus includes a laser diode 31 serving as measurement light generation means for emitting measurement light, and another laser diode 51 serving as reference light generation means for emitting reference light.

A fixed polarization fiber 233 divides each of measurement light and reference light into two biaxial light components polarized perpendicularly to each other and provides a relative delay between the two biaxial light components. The fixed polarization fiber 233 is constructed by connecting two fiber elements longitudinally at a point a shown in FIG. 19 with their axes inclined by 45° from each other so as to divide each of measurement light and reference light into two biaxial light components polarized perpendicularly to each other and provide a relative delay between the two biaxial light components.

A driver 235 varies the delay amount between two biaxial light components in the fixed polarization fiber 233. The driver 235 may be constituted, for example, from a cylindrical PZT (piezoelectric element) as seen from FIG. 8. The cylindrical piezoelectric element applies a pressure to the fixed polarization fiber 233 to vary the relative difference between the optical path lengths of two light beams propagated in the fixed polarization fiber 233.

A driver control circuit 236 controls the driving condition of the driver 235. The driver control circuit 236 can control the driver 235 so that signals of a signal train originating from interference light may have an equal or a substantially equal interval from each other.

Further, in the original wavelength/frequency detection apparatus of the present embodiment, a second fixed polarization fiber 234 having a similar characteristic and a similar length to those of the fixed polarization fiber 233 and having a fusion connection point at a point c shown in FIG. 19 with their axes inclined by 45° from each other similarly as at the point a of the fixed polarization fiber 233 is connected longitudinally to the fixed polarization fiber 233 at a point b such that their axes extend perpendicularly to each other. Further, a second driver 246 for varying the delay amount between two biaxial light beams in the second fixed polarization fiber 234 and a second driver control circuit 248 for controlling the driving condition of the second driver 246 are provided for the second fixed polarization fiber 234.

A cylindrical PZT (piezoelectric element) similar to that of the driver 235 may be employed also for the second driver 246. The cylindrical piezoelectric element applies a pressure to the second fixed polarization fiber 234 to vary the relative difference between optical path lengths of two light components propagated in the second fixed polarization fiber 234.

Also in this instance, the second driver control circuit 248 can control the second driver 246 so that signals of a signal train originating from interference light may have an equal or a substantially equal interval from each other.

Further, a temperature control section 56 for keeping the temperatures of the fixed polarization fiber 233 and the second fixed polarization fiber 234 at a desired temperature is provided. The temperature control section 56 may be similar to that described hereinabove in connection with the optical wavelength/frequency detection apparatus of the first embodiment with reference to FIG. 9.

A polarized light decomposing coupler 237 combines two biaxial light components outputted from the fixed polarization fiber 233 to output interference light of the measurement light.

A polarized light decomposing coupler 232 combines two biaxial light beams outputted from the fixed polarization fiber 233 to output interference light of the reference light.

Measurement interference light reception means 38 receives interference light of measurement light from the polarized light decomposing coupler 237. For example, a photodiode is used for the measurement interference light reception means 38.

Reference interference light reception means 52 receives interference light of reference light from the polarized light decomposing coupler 232. Also for the reference interference light reception means 52, for example, a photodiode is used.

A measurement interference light counter 39 receives the output of the measurement interference light reception means 38 and counts the number of interference pulses of measurement light received by the measurement interference light reception means 38 in response to operation of the driver 235.

A reference interference light counter 53 receives the output of the reference interference light reception means 52 and counts the number of interference pulses of reference light received by the reference interference light reception means 52 in response to operation of the driver 235.

A comparison calculation circuit 41 receives the outputs of the measurement interference light counter 39 and the reference interference light counter 53 and processes the measurement light information and the reference light information by comparison calculation processing to calculate a wavelength or a frequency of the measurement light.

Here, the principle of measurement of a wavelength (or a frequency) of measurement light calculated using the counters 39 and 53 and the comparison calculation circuit 41 in the present embodiment will be described.

In particular, in the present embodiment, inter mode interference of a fixed polarization fiber is applied, and sweeping of the optical path length difference of light passing the two perpendicular axes of the fixed polarization fiber is performed making use of a photoelastic effect, a thermo-optical effect or a like effect. For example, by wrapping a fixed polarization fiber around a cylindrical piezoelectric element and applying a lateral pressure to the fixed polarization fiber, sweeping is performed making use of a photoelastic effect. By performing sweeping in this manner, interference pulses of light are obtained in response to a wavelength of the measurement light.

Now, where the variation of the optical path length by a photoelastic effect is represented by $\Delta Lx$ with respect to the X axis and $\Delta Ly$ with respect to the Y axis, the optical path length difference $\Delta L$, (sweeping difference of the optical path length difference) between the two axes caused by a photoelastic effect is given by the following equation:

$$\Delta L = \Delta Lx - \Delta Ly \qquad (4)$$

Where the wavelength of the measurement light is represented by $\lambda$, the number M of interference pulses is give by the following equation:

$$M = \Delta L / \lambda \qquad (5)$$

Here, since M increases in proportion to $\lambda$, $\lambda$ can be measured by detection of M. Further, since M increases as $\Delta L$ increases, the resolution in measurement of $\lambda$ is increased.

Meanwhile, where the number of interference pulses of light outputted from the reference interference light counter 53 during sweeping from 0 to $\Delta L$ is represented by Mref, the wavelength $\lambda$ref of the reference light is given by $$\lambda\text{ref} = \Delta L / \text{Mref} \qquad (6)$$

Accordingly, the wavelength $\lambda$ of the measurement light can be obtained by calculation of $$\lambda = \lambda\text{ref} \cdot \text{Mref} / M \qquad (7)$$

obtained from the equations (5) and (6) above. Thus, an absolute wavelength can be calculated with a high degree of accuracy.

Further, where the optical path length of the fixed polarization fiber 233 when there is no variation of the optical path length by a photoelastic effect is represented by Lx with respect to the X axis and Ly with respect to the Y axis, the optical path lengths $\Delta$LL in the X axis and Y axis when there is a variation of the optical path length by a photoelastic effect is given by the following equation:

$$\Delta LL = (Lx + \Delta Lx) - (Ly + \Delta Ly) = (Lx - Ly) + \Delta L \qquad (8)$$

Here, if $Lx - Ly = \Delta L\text{fix}$, then $$\Delta LL = \Delta\text{fix} + \Delta L \qquad (9)$$

Since the length of the fixed polarization fiber 233 depends upon the magnitude of $\Delta L$ and a photoelastic effect and $\Delta L$fix increases in proportion to the length, when it is desired to increase $\Delta L$, the length of the fixed polarization fiber 233 is increased, end naturally $\Delta L$fix becomes great. $\Delta L$fix is a value which does not contribute to measurement, and if it becomes excessively great so that it is greater than the coherence length of measurement light or reference light, interference is not caused, which disables measurement. Ideally, $\Delta L$fix=0. Thus, in order to achieve $\Delta L$fix=0, the second fixed polarization fiber 234 having the same characteristic and the same length as those of the fixed polarization fiber 233 is prepared and connected to the fixed polarization fiber 233 with their axes displaced by 90° from each other. In this instance, the optical path length difference $\Delta LL$ is given by the following equation:

$$\Delta LL = (Lx + \Delta Lx + \Delta Ly) - (Ly + \Delta Ly + \Delta Lx) \\ = \Delta L \qquad (10)$$

Consequently, the length of the fixed polarization fiber 233 can be increased, and measurement with a high resolution is allowed.

Further, by additionally providing the second driver 246 also to the second fixed polarization fiber 234, various sweeping modes can be realized. In particular, when only the fixed polarization fiber 233 is swept, then $\Delta LL = \Delta L$, but when both of the fixed polarization fibers 233 and 234 are swept, then $\Delta LL = 0$, and when only the second fixed polarization fiber 234 is swept, then $\Delta LL = \Delta L$. Accordingly, the sweeping width apparently is $2\Delta L$ in the maximum, and consequently, M becomes great and the resolution is raised.

In the optical wavelength/frequency detection apparatus of the construction described above, each of measurement light from the laser diode 31 and reference light from the laser diode 51 is divided into two biaxial light components polarized perpendicularly to each other with a relative delay provided between the two biaxial light beams by each of the fixed polarization fibers 233 and 234. The fixed polarization fibers 233 and 234 are connected by fusion at the points a, b and c shown in FIG. 19 such that each adjacent fiber elements have axes inclined by 45° relative to each other so as to divide each of the measurement light and the reference light into two biaxial light components polarized perpendicularly to each other and provide a relative delay between the two biaxial light components. When each of measurement light and reference light is propagated in the fixed polarization fibers 233 and 234, the polarization of it is maintained.

The delay amount between two biaxial light components in each of the fixed polarization fibers 233 and 234 is varied by the dry fret 235 or 246. In this instance, the cylindrical piezoelectric element provided for each of the drivers 235 and 246 applies a pressure to the fixed polarization fiber to vary the refractive index of the fixed polarization fiber to produce a relative difference between optical path lengths of two light components propagated in each of the fixed polarization fibers 233 and 234.

It is to be noted that, in order to vary the optical path length difference in this manner, in addition to the method described above wherein a piezoelectric element is employed for a driver to apply a pressure in order to make use of a photoelastic effect as described above, a thermo-optical effect, an electro-optical effect or a magneto-optical effect may be employed alternatively. In order to make use of a thermo-optical effect, a Peltier element may be employed for a driver to vary the temperature. In order to make use of an electro-optical effect, an electric field may be applied, and in order to make use of a magneto-optical effect, a magnetic field may be applied.

The driving conditions of the drivers 235 and 246 are controlled by the driver control circuits 236 and 248, respectively. Further, the driver control circuits 236 and 248 can control the drivers 235 and 246, respectively, so that signals of a signal train originating from interference light may have an equal or a substantially equal interval from each other.

Where the drivers 235 and 246 are controlled by the driver control circuits 236 and 248, respectively, so that signals of a signal train originating from interference light may have an equal or a substantially equal interval from each other, the following advantages can be achieved.

In particular, when interference pulses of light are detected by means of a frequency counter, the interval between pulses must be equal, and also when the number of pulses is measured by means of a counter, preferably the interval between the pulses is equal. In order to output pulses at an equal interval, the optical path length difference must necessarily be swept linearly. However, even when the control signal for sweeping is llnear, the optical path length difference does not sometimes respond linearly. For example, when heat is generated by a heater employing chrome or a like material to make use of a thermo-optical effect, while, where the current of the sweeping signal is represented by I and the amount of heat generated in proportion to the optical path length difference is represented by Q, the amount of heat generation is given by $Q = I^2 \cdot R$ (R is a resistance of the heater), since, in this instance, the amount Q of heat generation does not increase in proportion to the sweeping signal I, the optical path length difference does not present a linear variation. Accordingly, each of the driver control circuits 236 and 248 outputs, as a sweeping signal, $I^2$ which increases in proportion to the optical path length difference. Consequently, signals of a signal train originating from interference light have an equal or a substantially equal interval from each other, which can contribute to enhancement of the counting accuracy.

The temperatures of the fixed polarization fibers 233 and 234 are kept at a desired temperature by the temperature control section 56.

The polarized light decomposing coupler 237 combines the two biaxial light components outputted from the fixed polarization fiber 233 and outputs interference light of the measurement light while the polarized light decomposing coupler 232 combines the two biaxial light components outputted from the fixed polarization fiber 233 and outputs interference light of the reference light.

The interference light of the measurement light from the polarized light decomposing coupler 237 is received by the photodiode of the measurement interference light reception means 38 while the interference light of the reference light of the polarized light decomposing coupler 232 is received by the reference interference light reception means 52.

The measurement interference light counter 39 receives the output of the measurement interference light reception means 38 and counts the number of interference pulses of the measurement light received by the measurement interference light reception means 38 in response to operation of the drivers 235 and 246.

Meanwhile, the interference light of the polarization holding coupler 32 is received by the photodiode of the reference interference light reception means 52. Then, the reference interference light counter 53 receives the output of the reference interference light reception means 52 and counts the number of interference pulses of the reference light received by the reference interference light reception means 52 in response to operation of the drivers 235 and 246.

The comparison calculation circuit 41 receives the outputs of the measurement interference light counter 39 and the reference interference light counter 53 and processes the measurement light information and the reference light information by comparison calculation processing to count a wavelength or a frequency of the measurement light.

With the optical wavelength/frequency detection apparatus of the fifth embodiment of the present invention described above, similar effects to those of the first embodiment described above can be achieved. In particular, since a variable part can be eliminated by varying the optical path length difference making use of any of various optical effects without employing a part of the bulk type, there is an advantage in that the reliability is assured for a long period of time, and besides, miniaturization of the apparatus is possible. Further, by employing an optical coupler, splitting and combining of light can be performed readily. Consequently, a wavelength or a frequency of measurement light can be detected with a high degree of accuracy and with a high resolution.

Further, by employing a polarization holding coupler and a fixed polarization fiber, polarization of light can be maintained. Consequently, a variation in intensity of interference light caused by a fluctuation in polarization between the two paths can be eliminated and stabilized detection of a wavelength can be achieved.

Furthermore, by providing a temperature control means, the variation of the optical path length difference of a fiber caused by a variation of the temperature of the external environment other than optical path length difference sweeping by a driver can be reduced considerably.

In addition, it can contribute to enhancement of the counting accuracy to cause signals of a signal train, which originates from interference light, to have an equal or a substantially equal interval from each other.

g. Sixth Embodiment

Figure 20:
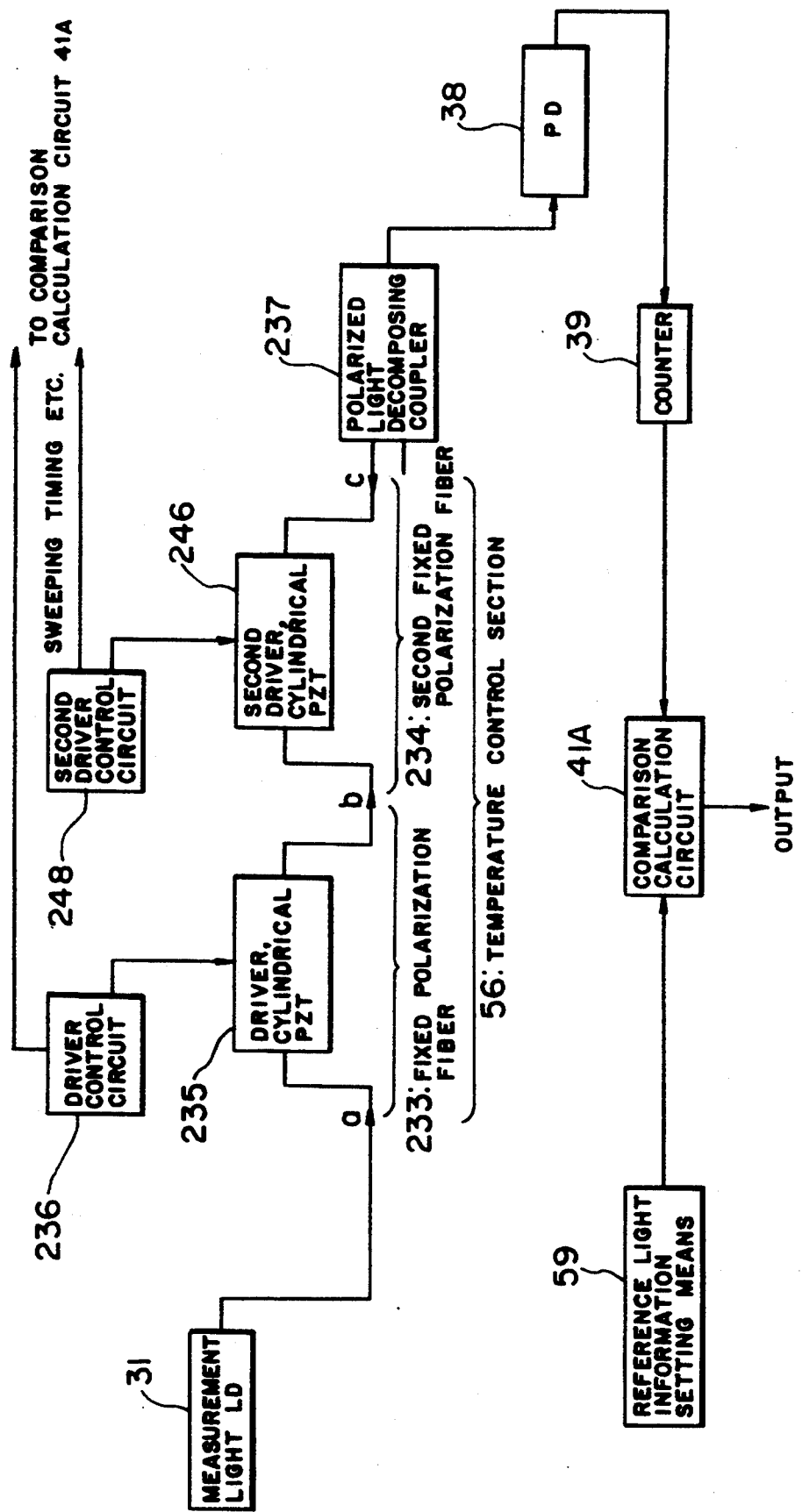
FIG. 20 is a block diagram of a yet further optical wavelength/frequency detection apparatus showing a sixth preferred embodiment of the present invention.
Figure 21:
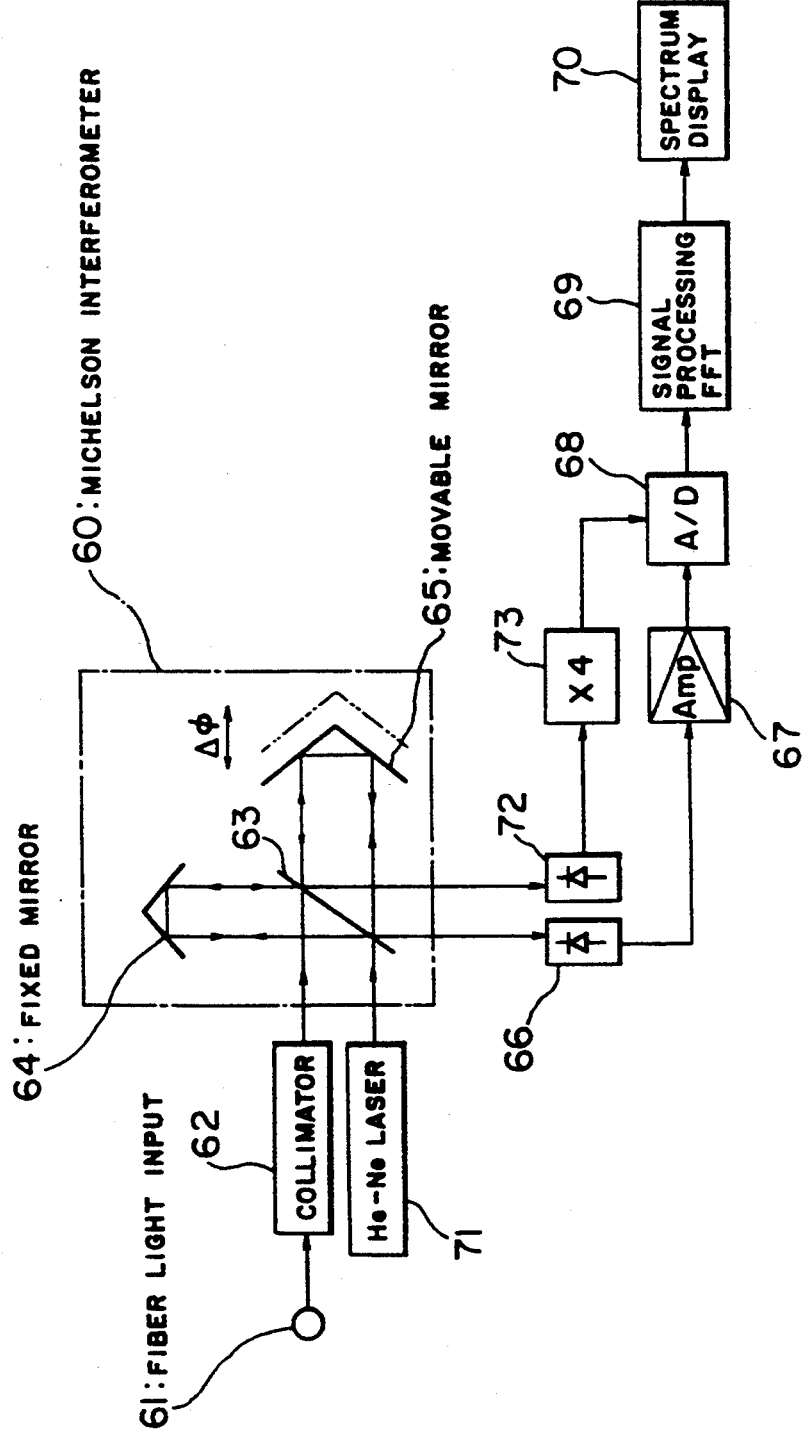
FIG. 21 is a block diagram showing an optical wavelength/frequency detection apparatus which employs a Michelson interferometer.

While the optical wavelength/frequency detection apparatus of the fifth embodiment involves generation of reference light by means of the laser diode 51 as described above, it may be modified so as to eliminate the system for reference light as seen in FIG. 20. Referring to FIG. 20, the modified optical wavelength/frequency detection apparatus does not include any system for reference light but includes reference light information setting means 59 for setting reference light information instead so that reference light information from the reference light information setting means 59 may be used as reference information for a comparison calculation circuit 41A. In this instance, the comparison calculation circuit 41A receives the outputs of the counter 39 and the reference light information setting means 59 and processes the measurement light information and the reference light information by comparison calculation processing to calculate a wavelength or a frequency of the measurement light. It is to be noted that like reference characters in FIG. 20 denote like reference elements to those of FIG. 19.

Also in the optical wavelength/frequency detection apparatus of the present embodiment, the second fixed polarization fiber 234 having a similar characteristic and a similar length to those of the fixed polarization fiber 233 is connected longitudinally to the fixed polarization fiber 233 such that their axes extend perpendicularly to each other. Further, the second driver 246 for varying the delay amount between two biaxial light beams in the second fixed polarization fiber 234 and the second driver control circuit 248 for controlling the driving condition of the second driver 246 are provided for the second fixed polarization fiber 234.

Further, the temperature control section 56 serving as optical fiber temperature stabilization means for keeping the temperatures of the fixed polarization optical fibers 233 and 234 at a desired temperature is provided.

Furthermore, the driver control circuits 236 and 248 control the drivers 235 and 246 so that signals of a signal train originating from interference light may have an equal or a substantially equal interval from each other.

The present invention is not limited to the specifically described embodiment, and variations and modifications may be made without departing from the scope of the present invention.

What is claimed is:

1. An optical wavelength/frequency detection apparatus, comprising:
   a measurement light splitting optical coupler for splitting measurement light and producing a first optical output and a second optical output.;
   a pair of optical fibers respectively propagating the first optical output and the second optical output of said measurement light splitting optical coupler;
   a driver varying a relative difference between optical path lengths of a first light beam and a second light beam propagating in respective said optical fibers;
   driver control means for controlling a driving condition of said driver;
   a measurement light combining optical coupler combining the first light beam and the second light beam of measurement light propagated in said respective optical fibers;
   light reception means for receiving interference light of the measurement light from said measurement light combining optical coupler;
   counting means for receiving an output of said light reception means and counting interference pulses of the measurement light received by said light reception means in response to operation of said driver;
   reference light information setting means for setting reference light information; and
   calculation means for receiving outputs of said counting means and said reference light information setting means and processing the measurement light information and the reference light information by comparison calculation processing to calculate one of a wavelength and a frequency of the measurement light.

2. An optical wavelength/frequency detection apparatus as claimed in claim 1, wherein each of said measurement light splitting optical coupler and said measurement light combining optical coupler is constructed as a polarization holding coupler while each of said optical fibers is constructed as a fixed polarization fiber.

3. An optical wavelength/frequency detection apparatus as claimed in claim 1, further comprising optical fiber temperature stabilization means for keeping the temperature of each of said optical fibers at a desired temperature.

4. An optical wavelength/frequency detection apparatus as claimed in claim 1, wherein said counting means counts the number of interference pulses of the measurement light only during sweeping of the optical path length difference between said optical fibers by said driver in one direction.

5. An optical wavelength/frequency detection apparatus as claimed in claim 1, wherein said counting means counts the number of interference pulses of the measurement light during sweeping of the optical path measurement light between said optical fibers by said driver in both of a going path and a returning path.

6. An optical wavelength/frequency detection apparatus as claimed in claim 5, wherein said calculation means applies averaging processing to one of a wavelength and a frequency of the measurement light obtained from the number of interference pulses of the measurement light during sweeping of the optical path length difference between said optical fibers by said driver in the going path and to one of a wavelength and a frequency of the measurement light obtained from the number of interference pulses of the measurement light during sweeping of the optical path length difference between said optical fibers by said driver in the returning path to calculate one of a wavelength and a frequency of the measurement light.

7. An optical wavelength/frequency detection apparatus as claimed in claim 1, wherein said driver is provided for each of said optical fibers.

8. An optical wavelength/frequency detection apparatus as claimed in claim 7, wherein the difference between the lengths of said optical fibers is set greater than the width of variation of the optical path lengths of said optical fibers, and said driver control means includes means for causing said driver to perform a push-pull operation.

9. An optical wavelength/frequency detection apparatus as claimed in claim 1, wherein said driver control means controls said driver so that pulses of a pulse train arising from the interference light of the measurement light are displaced at one of an equal interval from each other and substantially an equal interval from each other.

10. An optical wavelength/frequency detection apparatus, comprising:
- a measurement light splitting and reference light combining optical coupler splitting measurement light and combining reference light;
- a reference light splitting and measurement light combining optical coupler splitting the reference light and combining the measurement light;
- a pair of optical fibers, interposed between said measurement light splitting and reference light combining optical coupler and said reference light splitting and measurement light combining optical coupler, propagating two optical outputs of each of said optical couplers;
- a driver varying the relative difference between optical path lengths of two light beams propagated in said optical fibers;
- driver control means for controlling the driving condition of said driver;
- measurement interference light reception means for receiving interference light of the measurement light from said reference light splitting and measurement light combining optical coupler;
- reference interference light reception means for receiving interference light of the reference light from said measurement light splitting and reference light combining optical coupler;
- measurement interference light counting means for receiving an output of said measurement interference light reception means and counting the number of interference pulses of the measurement light received by said measurement interference light reception means in response to operation of said driver;
- reference interference light counting means for receiving an output of said reference interference light reception means and counting the number of interference pulses of the reference light received by said reference interference light reception means in response to operation of said driver; and
- calculation means for receiving outputs of said measurement interference light counting means and said reference interference light counting means and processing the measurement light information and the reference light information by comparison calculation processing to calculate one of a wavelength and a frequency of the measurement light.

11. An optical wavelength/frequency detection apparatus as claimed in claim 10, wherein each of said measurement light splitting and reference light combining optical coupler and said reference light splitting and measurement light combining optical coupler is constructed as a polarization holding coupler while each of said optical fibers is constructed as a fixed polarization fiber.

12. An optical wavelength/frequency detection apparatus as claimed in claim 10, further comprising optical fiber temperature stabilization means for keeping the temperature of each of said optical fibers at a desired temperature.

13. An optical wavelength/frequency detection apparatus as claimed in claim 10, wherein said counting means counts the number of interference pulses of the measurement light only during sweeping of the optical path length difference between said optical fibers by said driver in one direction.

14. An optical wavelength/frequency detection apparatus as claimed in claim 10, wherein said counting means counts the number of interference pulses of the measurement light during sweeping of the optical path length difference between said optical fibers by said driver in both of a going path and a returning path.

15. An optical wavelength/frequency detection apparatus as claimed in claim 14, wherein said calculation means applies averaging processing to one of a wavelength and a frequency of measurement light obtained from the number of interference pulses of the measurement light during sweeping of the optical path length difference between said optical fibers by said driver in the going path and to one of a wavelength and a frequency of the measurement light obtained from the number of interference pulses of the measurement light during sweeping of the optical path length difference between said optical fibers by said driver in the returning path to calculate one of a wavelength and a frequency of the measurement light.

16. An optical wavelength/frequency detection apparatus as claimed in claim 10, wherein said driver is provided for each of said optical fibers.

17. An optical wavelength/frequency detection apparatus as claimed in claim 16, wherein the difference between the lengths of said optical fibers is set greater than the width of variation of the optical path lengths of said optical fibers, and said driver control means includes means for causing the driver to perform a push-pull operation.

18. An optical wavelength/frequency detection apparatus as claimed in claim 10, wherein said driver control means controls said driver so that pulses of a pulse train arising from the interference light of the measurement light are displaced at one of an equal interval and substantially an equal interval from each other.

19. An optical wavelength/frequency detection apparatus, comprising:
- a pair of optical fibers receiving two optical outputs at respective first ends thereof and propagating the received optical outputs therethrough;
- a driver varying a relative difference between optical path lengths of two light beams propagated in said optical fibers;
- driver control means for controlling a driving condition of said driver;
- reflection means for reflecting the light having propagated in said pair of optical fibers at respective second ends of said optical fibers so that the light is introduced back into the corresponding ones of said optical fibers;
- a measurement light splitting and combining optical coupler splitting measurement light into two beams and inputting the two beams into the respective first ends of said optical fibers and combining the reflected measurement light outputted from the respective first ends of said optical fibers;
- light reception means for receiving interference light of the measurement light from said measurement light splitting and combining optical coupler;

counting means for receiving the output of said light reception means and counting the number of interference pulses of the measurement light received by said light reception means in response to operation of said driver;

reference light information setting means for setting reference light information; and calculation means for receiving the outputs of said counting means and said reference light information setting means and processing the measurement light information and the reference light information by comparison calculation processing to calculate one of a wavelength and a frequency of the measurement light.

20. An optical wavelength/frequency detection apparatus as claimed in claim 19, wherein each of said measurement light splitting and reference light combining optical coupler and said reference light splitting and measurement light combining optical coupler is constructed as a polarization holding coupler while each of said optical fibers is constructed as a fixed polarization fiber.

21. An optical wavelength/frequency detection apparatus as claimed in claim 19, wherein said optical fibers are polarization holding optical fibers, and said reflection means is constructed together with an optical non-reciprocal element located adjacent the respective second ends of the polarization holding optical fibers for rotating the polarization direction by $45° + 90° \times m$, m being 0, 1, 2, ...

22. An optical wavelength/frequency detection apparatus as claimed in claim 19, wherein said optical fibers are polarization holding optical fibers and said reflection means is constructed together with a quarter wavelength member located adjacent the respective second ends of the polarization holding optical fibers and having optical axes inclined by 45° with respect to a stress applying direction of said polarization holding optical fibers.

23. An optical wavelength/frequency detection apparatus as claimed in claim 19, wherein said optical fibers are polarization holding optical fibers and said reflection means is constructed as a reflection mirror located adjacent the respective second ends of said polarization holding optical fibers and having a predetermined reflection factor.

24. An optical wavelength/frequency detection apparatus as claimed in claim 19, further comprising optical fiber temperature stabilization means for keeping the temperature of each of said optical fibers at a desired temperature.

25. An optical wavelength/frequency detection apparatus as claimed in claim 19, wherein said counting means counts the number of interference pulses of the measurement light only during sweeping of the optical path length difference between said optical fibers by said driver in one direction.

26. An optical wavelength/frequency detection apparatus as claimed in claim 19, wherein said counting means counts the number of interference pulses of the measurement light during sweeping of the optical path length difference between said optical fibers by said driver in both of a going path and a returning path.

27. An optical wavelength/frequency detection apparatus as claimed in claim 26, wherein said calculation means applies averaging processing to one of a wavelength and a frequency of the measurement light obtained from the number of interference pulses of the measurement light during sweeping of the optical path length difference between said optical fibers by said driver in the going path and to one of a wavelength and a frequency of the measurement light obtained from the number of interference pulses of the measurement light during sweeping of the optical path length difference between said optical fibers by said driver in the returning path to calculate one of a wavelength and a frequency of the measurement light.

28. An optical wavelength/frequency detection apparatus as claimed in claim 19, wherein said driver is provided for each of said optical fibers.

29. An optical wavelength/frequency detection apparatus as claimed in claim 28, wherein the difference between the lengths of said optical fibers is set greater than the width of variation of the optical path lengths of said optical fibers, and said driver control means includes means for causing said driver to perform a push-pull operation.

30. An optical wavelength/frequency detection apparatus as claimed in claim 19, wherein said driver control means controls said driver so that pulses of a pulse train arising from the interference light of the measurement light are displaced at one of an equal interval from each other and substantially an equal interval from each other.

31. An optical wavelength/frequency detection apparatus, comprising:

polarized light composition means for composing measurement light and reference light so that the measurement light and the reference light may be mutually perpendicularly polarized light;

a pair of polarization holding optical fibers receiving an optical output of said polarized light composition means at respective first ends of said pair of polarization holding optical fibers and propagating the received polarized light therethrough while maintaining the polarizations of the polarized light;

a driver varying the relative difference between optical path lengths of the two light beams propagated in said pair of polarization holding optical fibers;

driver control means for controlling a driving condition of said driver;

reflection means for reflecting the light having propagated in said polarization holding optical fibers at respective second ends of said polarization holding optical fibers so that the reflected light may be introduced into corresponding ones of said polarization holding optical fibers;

polarized light splitting and combining means interposed between said polarized light composition means and said polarization holding optical fibers for splitting the optical output of said polarized light composition means into two beams and inputting the two beams into the first ends of said polarization holding optical fibers and for combining the reflected light outputted from the first ends of said polarization holding optical fibers;

polarized light decomposition means for decomposing the light combined by said polarized light splitting and combining means into two polarized light beams polarized perpendicularly to each other;

measurement interference light reception means for receiving interference light of the measurement light decomposed by said polarized light decomposition means;

reference interference light reception means for receiving interference light of the reference light decomposed by said polarization light decomposition means;

measurement interference light counting means for receiving an output of said measurement interference light reception means and counting a number of interference pulses of the measurement light received by said measurement interference light reception means in response to operation of said driver;

reference interference light counting means for receiving an output of said reference interference light reception means and counting a number of interference pulses of the reference light received by said reference interference light reception means in response to operation of said driver; and calculation means for receiving outputs of said measurement interference light counting means and said reference interference light counting means and processing the measurement light information and the reference light information by comparison calculation processing to calculate one of a wavelength and a frequency of the measurement light.

32. An optical wavelength/frequency detection apparatus as claimed in claim 31, wherein said reflection means is constructed together with an optical non-reciprocal element located adjacent the respective second ends of the polarization holding optical fibers for rotating the polarization direction by 45°+90° x m, m being 0, 1, 2, ...

33. An optical wavelength/frequency detection apparatus as claimed in claim 31, wherein said reflection means is constructed together with a quarter wavelength member located adjacent the respective second ends of the pair of polarization holding optical fibers and having optical axes inclined by 45° with respect to a stress applying direction of said polarization holding optical fibers.

34. An optical wavelength/frequency detection apparatus as claimed in claim 31, wherein said reflection means is constructed as a reflection mirror located adjacent the respective second ends of the polarization holding optical fibers and having a predetermined reflection factor.

35. An optical wavelength/frequency detection apparatus as claimed in claim 31, further comprising optical fiber temperature stabilization means for keeping the temperature of each of said optical fibers at a desired temperature.

36. An optical wavelength/frequency detection apparatus as claimed in claim 31, wherein said counting means counts the number of interference pulses of the measurement light only during sweeping of the optical path length difference between said optical fibers by said driver in one direction.

37. An optical wavelength/frequency detection apparatus as claimed in claim 31, wherein said counting means counts the number of interference pulses of the measurement light during sweeping of the optical path length difference between said optical fibers by said driver in both of a going path and a returning path.

38. An optical wavelength/frequency detection apparatus as claimed in claim 37, wherein said calculation means applies averaging processing to one of a wavelength and a frequency of the measurement light obtained from the number of interference pulses of the measurement light during sweeping of the optical path length difference between said optical fibers by said driver in the going path and to a wavelength and a frequency of the measurement light obtained from the number of interference pulses of the measurement light during sweeping of the optical path length difference between said optical fibers by said driver in the returning path to calculate one of a wavelength and a frequency of the measurement light.

39. An optical wavelength/frequency detection apparatus as claimed in claim 31, wherein said driver is provided for each of said optical fibers.

40. An optical wavelength/frequency detection apparatus as claimed in claim 39, wherein the difference between the lengths of said optical fibers is set greater than the width of variation of the optical path lengths of said optical fibers, and said driver control means includes means for causing said driver to perform a push-pull operation.

41. An optical wavelength/frequency detection apparatus as claimed in claim 31, wherein said driver control means controls said driver so that pulses of a pulse train arising from the interference light of the measurement light are displaced at one of an equal interval from each other and substantially an equal interval from each other.

42. An optical wavelength/frequency detection apparatus, comprising:

a first fixed polarization fiber dividing measurement light into two biaxial light components polarized perpendicularly to each other and providing a relative delay to the two biaxial light components;

a first driver varying a delay amount between the two biaxial light components in said fixed polarization fiber;

first driver control means for controlling a driving condition of said first driver;

polarization means for combining the two biaxial light components outputted from said first fixed polarization fiber to output interference light of the measurement light;

light reception means for receiving the interference light of the measurement light from said polarization means;

counting means for receiving an output of said light reception means and counting a number of interference pulses of the measurement light received by said light reception means in response to operation of said driver;

reference light information setting means for setting reference light information; and calculation means for receiving outputs of said counting means and said reference light information setting means and processing the measurement light information and the reference light information by comparison calculation processing to calculate one of a wavelength and a frequency of the measurement light.

43. An optical wavelength/frequency detection apparatus as claimed in claim 42, further comprising a second fixed polarization fiber having a similar characteristic and a similar length to the first fixed polarization fiber and connected to the first fixed polarization fiber such that the axes of the first fixed polarization fiber and the second fixed polarization fiber extend perpendicularly with each other.

44. An optical wavelength/frequency detection apparatus as claimed in claim 43, further comprising a second driver for varying the delay amount of two biaxial light components in said second fixed polarization fiber, and second driver control means for controlling the driving condition of said second driver.

45. An optical wavelength/frequency detection apparatus as claimed in claim 42, further comprising optical fiber temperature stabilization means for keeping the temperature of said first fixed polarization fiber at a desired temperature.

46. An optical wavelength/frequency detection apparatus as claimed in claim 43, further comprising optical fiber temperature stabilization means for keeping the temperatures of said first fixed polarization optical fiber and said second fixed polarization fiber at a desired temperature.

47. An optical wavelength/frequency detection apparatus as claimed in claim 42, wherein said first driver control means controls said first driver so that pulses of a pulse train arising from the interference light of the measurement light are displaced at one of an equal interval from each other and substantially an equal interval from each other.

48. An optical wavelength/frequency detection apparatus as claimed in claim 44, wherein said first driver control means and said second driver control means control said first driver and second second driver, respectively, so that pulses of a pulse train arising from the interference light of the measurement light are displaced at one of an equal interval from each other and substantially an equal interval from each other.

49. An optical wavelength/frequency detection apparatus, comprising:
 a first fixed polarization fiber dividing each of measurement light and reference light into two biaxial light components polarized perpendicularly to each other and providing a relative delay between the two biaxial light components;
 a first driver varying a delay amount between the two biaxial light components in said fixed polarization fiber;
 first driver control means for controlling a driving condition of said first driver;
 first polarization means for combining the two biaxial light components outputted from said fixed polarization fiber to output interference light of the measurement light;
 second polarization means for combining the two biaxial light components outputted from said fixed polarization fiber to output interference light of the reference light;
 measurement interference light reception means for receiving interference light of the measurement light from said first polarization means;
 reference interference light reception means for receiving interference light of the reference light from said second polarization means;
 measurement interference light counting means for receiving an output of said measurement interference light reception means and counting a number of interference pulses of the measurement light received by said measurement interference light reception means in response to operation of said driver;
 reference interference light counting means for receiving an output of said reference interference light reception means and counting a number of interference pulses of the reference light received by said reference interference light reception means in response to operation of said driver; and
 calculation means for receiving outputs of said measurement interference light counting means and said reference interference light counting means and processing the measurement light information and the reference light information by comparison calculation processing to calculate one of a wavelength and a frequency of the measurement light.

50. An optical wavelength/frequency detection apparatus as claimed in claim 49, further comprising a second fixed polarization fiber having a similar characteristic and a similar length to those of the first fixed polarization fiber and connected to the first fixed polarization fiber such that the axes of the first fixed polarization fiber and the second fixed polarization fiber extend perpendicularly with each other.

51. An optical wavelength/frequency detection apparatus as claimed in claim 50, further comprising a second driver varying a delay amount of two biaxial light components in said second fixed polarization fiber, and second driver control means for controlling a driving condition of said second driver.

52. An optical wavelength/frequency detection apparatus as claimed in claim 49, further comprising optical fiber temperature stabilization means for keeping the temperature of said fixed polarization fiber at a desired temperature.

53. An optical wavelength/frequency detection apparatus as claimed in claim 50, further comprising optical fiber temperature stabilization means for keeping the temperatures of said first fixed polarization optical fiber and said second fixed polarization fiber at a desired temperature.

54. An optical wavelength/frequency detection apparatus as claimed in claim 49, wherein said first driver control means controls said first driver so that pulses of a pulse train arising from the interference light of the measurement light are displaced at one of an equal interval from each other and substantially an equal interval from each other.

55. An optical wavelength/frequency detection apparatus as claimed in claim 51, wherein said first driver control means and said second driver control means control said first driver and said second driver, respectively, so that pulses of a pulse train arising from the interference light of the measurement light are displaced at one of an equal interval from each other and substantially an equal interval from each other.

* * * * *

UNITED STATES PATENT AND TRADEMARK OFFICE
CERTIFICATE OF CORRECTION

PATENT NO. : 5,426,502
DATED : June 20, 1995
INVENTOR(S) : Miyata et al.

It is certified that error appears in the above-indentified patent and that said Letters Patent is hereby corrected as shown below:

Column 1, line 35, "53" should be --63--.

Column 2, line 37, "OF" should be -- or --.
line 61, "Coupler" should be --coupler--.

Column 10, line 20, after "coupler", insert --17--.

Column 13, line 33, "IEO" should be --126--;
line 53, after "means", insert --117--.

Column 15, line 20, after "4,", insert --13--;
line 63, "208" should be --206--.

UNITED STATES PATENT AND TRADEMARK OFFICE
CERTIFICATE OF CORRECTION

PATENT NO. : 5,426,502
DATED : June 20, 1995
INVENTOR(S) : Miyata et al.

It is certified that error appears in the above-indentified patent and that said Letters Patent is hereby corrected as shown below:

Column 17, line 20, after "means", insert --219--.

Column 18, line 55, "a" should be --a--.

Column 28, line 16, "OF" should be --or--.

Column 31, line 32, "OF should be --or--.

Column 32, line 65, "59and" should be --59 and--.

UNITED STATES PATENT AND TRADEMARK OFFICE
CERTIFICATE OF CORRECTION

PATENT NO. : 5,426,502
DATED : June 20, 1995
INVENTOR(S) : Miyata et al

It is certified that error appears in the above-indentified patent and that said Letters Patent is hereby corrected as shown below:

Column 33, line 66, "a" should be --$\underline{a}$--.

Column 34, line 24, "a" should be --$\underline{a}$--.

Signed and Sealed this

Nineteenth Day of December, 1995

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,426,502
DATED : June 20, 1995
INVENTOR(S) : Miyata et al.

It is certified that error appears in the above-indentified patent and that said Letters Patent is hereby corrected as shown below:

ON THE COVER : Assignee, item [75], line 2, change "Yoshihto Onoda" to --Yoshihito Onoda--.

Signed and Sealed this

Twenty-second Day of October, 1996

Attest:

BRUCE LEHMAN

*Attesting Officer*     *Commissioner of Patents and Trademarks*